(12) United States Patent
Itazu et al.

(10) Patent No.: US 8,527,162 B2
(45) Date of Patent: Sep. 3, 2013

(54) CONTROL APPARATUS FOR AN AUTOMATIC TRANSMISSION

(75) Inventors: Naoki Itazu, Nagoya (JP); Yoshinobu Nozaki, Anjyo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 87 days.

(21) Appl. No.: 13/255,835

(22) PCT Filed: Mar. 12, 2009

(86) PCT No.: PCT/JP2009/001106
§ 371 (c)(1),
(2), (4) Date: Sep. 9, 2011

(87) PCT Pub. No.: WO2010/103572
PCT Pub. Date: Sep. 16, 2010

(65) Prior Publication Data
US 2011/0320096 A1    Dec. 29, 2011

(51) Int. Cl.
*G06F 19/00* (2011.01)

(52) U.S. Cl.
USPC .......................................................... 701/51

(58) Field of Classification Search
USPC ............................... 701/51, 53, 54, 58, 93, 95
See application file for complete search history.

(56) References Cited

U.S. PATENT DOCUMENTS

| 5,682,791 A | 11/1997 | Liesener |
| 2007/0087897 A1* | 4/2007 | Kitamura ...................... 477/115 |
| 2008/0070747 A1* | 3/2008 | Kitamura et al. ............. 477/107 |

FOREIGN PATENT DOCUMENTS

| JP | 09-112679 A | 5/1997 |
| JP | 10-078128 A | 3/1998 |
| JP | 2002-533631 A | 10/2002 |
| JP | 2006-336717 A | 12/2006 |
| WO | 00/37836 A1 | 6/2000 |

* cited by examiner

*Primary Examiner* — Kim T Nguyen
(74) *Attorney, Agent, or Firm* — Sughrue Mion, PLLC

(57) ABSTRACT

A control apparatus for an automatic transmission prevents friction engagement elements from being kept in an engagement state in accordance with the traveling state of a vehicle when a shift lever is operated to the position where a neutral range is formed, even if the malfunction of a solenoid valves occurs. If the shift range is switched to an N range, an ECU controls an So3 solenoid valve to enter an energized state, and controls a speed change mechanism to enter a non-transmission state, when the ECU judges that vehicle speed V is smaller than an N range forming method changing threshold Vn. The ECU controls an SL1 linear solenoid valve to enter a de-energized state, and controls the speed change mechanism to enter the non-transmission state, when the ECU judges that the vehicle speed V is no less than the N range forming method changing threshold Vn.

10 Claims, 9 Drawing Sheets

FIG.4

|   |     | C1 | C2 | C3 | C4 | B1 | B2 | F1 |
|---|-----|----|----|----|----|----|----|----|
| P |     | ×  | ×  | ×  | ×  | ×  | ×  | ×  |
| R |     | ×  | ×  | ×  | ○  | ×  | ○  | ×  |
| N |     | ×  | ×  | ×  | ×  | ×  | ×  | ×  |
| D | 1st | ○  | ×  | ×  | ×  | ×  | ◎  | △  |
|   | 2nd | ○  | ×  | ×  | ×  | ○  | ×  | ×  |
|   | 3rd | ○  | ×  | ○  | ×  | ×  | ×  | ×  |
|   | 4th | ○  | ×  | ×  | ○  | ×  | ×  | ×  |
|   | 5th | ○  | ○  | ×  | ×  | ×  | ×  | ×  |
|   | 6th | ×  | ○  | ×  | ○  | ×  | ×  | ×  |
|   | 7th | ×  | ○  | ○  | ×  | ×  | ×  | ×  |
|   | 8th | ×  | ○  | ×  | ×  | ○  | ×  | ×  |

○ : ENGAGEMENT
× : DISENGAGEMENT
◎ : ENGAGEMENT WHEN ENGINE BRAKE IS USED
△ : ENGAGEMENT WHEN ENGINE IS DRIVEN

FIG.7

|   |   | ON/OFF SOLENOID ||| LINEAR SOLENOID ||||||
|---|---|---|---|---|---|---|---|---|---|---|
|   |   | So1 N/C | So2 N/C | So3 N/C | SL1 N/C | SL2 N/C | SL3 N/C | SL4 N/C | SL5 N/C | SL6 N/C |
| P |   | × | ○ | × | × | × | × | × | × | × |
| R |   | ○ | × | × | × | × | × | ○ | × | ○ |
| N |   | ○ | × | × | × | × | × | × | × | × |
| D | 1st | ○ | × | × | ○ | × | × | × | × | × |
| D | 1st E/B | ○ | × | × | ○ | × | × | × | × | ○ |
| D | 2nd | × | × | × | ○ | × | × | × | ○ | × |
| D | 3rd | × | × | × | ○ | × | ○ | × | × | × |
| D | 4th | × | × | × | ○ | × | × | ○ | × | × |
| D | 5th | × | × | × | ○ | ○ | × | × | × | × |
| D | 6th | × | × | × | × | ○ | × | ○ | × | × |
| D | 7th | × | × | × | × | ○ | ○ | × | × | × |
| D | 8th | × | × | × | × | ○ | × | × | ○ | × |

N/C : NORMAL CLOSE (CLOSED IN DE-ENERGIZED STATE)
○ : ENERGIZED
× : DE-ENERGIZED

CONTROL APPARATUS FOR AN AUTOMATIC TRANSMISSION

CROSS REFERENCE TO RELATED APPLICATION

This application is a National Stage of International Application No. PCT/JP2009/001106 filed Mar. 12, 2009, the contents of all of which are incorporated herein by reference in their entirety.

TECHNICAL FIELD

The present invention relates to a control apparatus for an automatic transmission.

BACKGROUND ART

A conventional automatic transmission to be mounted on a vehicle is adapted to transmit drive force from an engine to a transmission mechanism through a torque convertor, and constructed to engage or disengage clutches and brakes constituting a friction engagement element, and to a switch power transmission path formed by a plurality of gear pairs to form a shift range and a desired shift stage.

The clutches and brakes are operative to have their engagement state and disengagement state alternatively switched in accordance with hydraulic paths switched by operating various solenoid valves and a manual valve forming part of a hydraulic pressure circuit.

Here, the engine is operative to rotate an oil pump which in turn produces a line pressure to be supplied to each of hydraulic paths operative to be switched by the manual valve. Further, the line pressure to be supplied to the hydraulic paths are adjusted by the solenoid valves provided on the hydraulic paths at the downstream sides of the manual valve to be supplied to cylinders to operate the clutches and the brakes.

When the manual valve is operated, each of the shift ranges are formed, and concurrently the oil pressure to be supplied to the hydraulic cylinders is adjusted, thereby causing the clutches and the brakes to be switched to any one of the engagement and disengagement states.

The manual valve is operatively connected with a shift lever through a connection member, to ensure that the shift ranges are formed in response of the operation positions of the shift lever.

In recent years, there has so far been proposed a shift-by-wire system which is so called to electrically perform a transmission control in response to the operation positions of the shift lever. In response to the development of the shift-by-wire system, there appears an automatic transmission provided with no manual valve to be increased in number (for example see Patent Document 1).

The conventional automatic transmission disclosed in the Patent Document 1 is provided with no manual valve, so that any one or more solenoid valves is preliminarily set to be operated based on the electromagnet valve logic, thereby operating the solenoid valves corresponding to the desired backward advance shift stage and the forward advance shift stages. In this way, the conventional automatic transmission disclosed in the Patent Document 1 operates the solenoid valves corresponding to the desired shift stages, so that the brakes and the clutches can be operated on the electromagnet valve logic to form the desired backward advance shift stage and the forward advance shift stages.

Due to the fact that the automatic transmission can realize the changes of the shift stage and the transmission shifts by the shift-by-wire system but is provided with no manual valve, an ECU (Electronic Control Unit) is adapted to control the solenoid valves based on the detection results from a plurality of shift sensors provided at the operation positions of the shift lever and the electromagnet valve logic.

CITATION LIST

Patent Literature

{PTL 1} Published Japanese translation of PCT international publication No. 2002-533631

SUMMARY OF INVENTION

Technical Problem

The automatic transmission provided with a conventional manual valve encounters no problem that even if the shift lever is shifted to a position where a neutral range is formed in the state having a solenoid valve malfunctioned, the manual valve can shut down original pressure fed to the solenoid valve, thereby preventing the advance clutch from falling into its engagement state. However, the control apparatus for the automatic transmission disclosed in the known Patent Document 1 encounters such a problem that the automatic transmission is provided with no conventional manual valve, so that the drive force from the drive source is transmitted to the wheels through the transmission mechanism irrespective of the shift lever being shifted to the position where the neutral range is formed under the condition that the advance clutch is fallen into its engagement state by the malfunctioned solenoid valve.

As will be understood from the foregoing description, the conventional control apparatus for the automatic transmission disclosed in the Patent Document 1 and provided with no manual valve therefore encounters such a problem that the behavior of the vehicle comes against the driver's consciousness when such a malfunction is caused on the solenoid valve when the vehicle is moving at an extremely low speed almost equal to the stopped vehicle.

Especially, even if the malfunction of the solenoid valve is caused, and the advance clutch is brought into its engagement state to have the drive force from the drive source transmitted to the wheel when the vehicle is cruising, the behavior of the vehicle does not come against the driver's consciousness due to the state that the vehicle is cruising; however, above mentioned problem is caused for example when the vehicle is cruising at the low speed.

The present invention has been made for solving the conventional problems encountered by the conventional control apparatus for the automatic transmission, and it is therefore an object of the present invention to provide a control apparatus for the automatic transmission which is capable of preventing the friction engagement elements from being kept in the engagement state in response to the traveling state of the vehicle when the shift lever is operated to the position where the neutral range is formed, even if the malfunction of one or more solenoid valves occurs.

Solution to Problem

To achieve the above object of the present invention, the control apparatus for the automatic transmission, (1) comprises a speed change mechanism including an input shaft for inputting a rotational drive force from a driving source, an output shaft for transmitting the rotational drive force to a plurality of wheels, and a plurality of friction engagement elements, operation states of which being switched between an engagement state and a disengagement state, so as to change the speed of the rotation inputted from the input shaft and to output the rotation with the changed speed; an operating member for selecting one of a plurality of shift ranges including a neutral range by being operated to one of a plurality of operation positions; operation position detecting means for detecting one of the operation positions to where the operating member is operated; a plurality of operation state switching means for switching the operation states of the plurality of friction engagement elements by regulating oil pressure of hydraulic oil which is supplied to the plurality of friction engagement elements; vehicle speed detecting means for detecting a vehicle speed of a vehicle; supply state switching means for switching operation states between a supply state in which the hydraulic oil is supplied to the plurality of operation state switching means and a cut-off state in which supply of hydraulic oil to the plurality of operation state switching means is cut off; and control means for setting one selected from among the plurality of shift ranges on the basis of the operation position detected by the operation position detecting means, and for controlling, in accordance with the vehicle speed detected by the vehicle speed detecting means, the plurality of operation state switching means and/or the supply state switching means when the operating member is operated to one of the plurality of operation positions corresponding to the neutral range, thereby forming a non-transmission state where the rotational drive force is prevented from being transmitted to the output shaft from the input shaft.

The control apparatus for the automatic transmission thus constructed is capable of cutting off the supply of the hydraulic oil to the plurality of operation state switching means by the supply state switching means in the case where the neutral range is set by the control means, and when, for example, the vehicle stops, even if the operation states of the one or more friction engagement elements cannot be switched due to the malfunction of the corresponding operation state switching means. This results from the fact that the control means forms the non-transmission state by controlling selectively the plurality of operation state switching means or the supply state switching means in accordance with the vehicle speed detected by the vehicle speed detecting means in the case where the neutral range is set. As a result, the rotational drive force from the driving source is prevented from being transmitted to the output shaft through the input shaft when the neutral range is set by the control means. Therefore the control apparatus for an automatic transmission thus constructed can prevent the behavior of the vehicle being inconsistent with the operation of the operating member by a driver, and can improve the safety as compared to that of the prior art.

In the control apparatus for the automatic transmission as set forth in the above definition (1), (2) in the case where the control means sets the neutral range, the control means may be adapted to form the non-transmission state by controlling the supply state switching means when the vehicle speed detected by the vehicle speed detecting means is smaller than a predetermined vehicle speed, whereas the control means is adapted to form the non-transmission state by controlling the plurality of operation state switching means when the vehicle speed detected by the vehicle speed detecting means is no less than the predetermined vehicle speed.

The control apparatus for the automatic transmission thus constructed is capable of cutting off the supply of the hydraulic oil to the plurality of operation state switching means by the supply state switching means when, for example, the vehicle stops, even if the operation states of the one or more friction engagement elements cannot be switched due to the malfunction of the corresponding operation state switching means. This results from the fact that the control means forms the non-transmission state by controlling selectively the plurality of operation state switching means or the supply state switching means, selectively, in accordance with the vehicle speed detected by the vehicle speed detecting means. As a result, the rotational drive force from the driving source is prevented from being transmitted to the output shaft through the input shaft when the neutral range is set by the control means. Therefore the control apparatus for an automatic transmission thus constructed can prevent the behavior of the vehicle being inconsistent with the operation of the operating member by the driver, and can improve the safety as compared to that of the prior art.

Meanwhile, the control apparatus for the automatic transmission thus constructed is capable of cutting off the supply of the hydraulic oil to the friction engagement elements by the plurality of operation state switching means when, for example, the vehicle is cruising. As a result, even if the operation states of the one or more friction engagement elements cannot be switched due to the malfunction of the corresponding operation state switching means, the behavior of the vehicle is consistent with the operation of the operating member by the driver in the case where the neutral range is set by the control means, as long as the vehicle is cruising. Therefore the driver can be prevented from feeling uncomfortable with the behavior of the vehicle. While there is no malfunction in any one of the plurality of operation state switching means, the immediate responsiveness of the friction engagement elements is improved when the shift range is set from the neutral range to one of the other ranges by the control means, as compared to the case where the supply of the hydraulic oil to the friction engagement elements is cut off by the supply state switching means.

In the control apparatus for the automatic transmission as set forth in the above definition (1), (3) in the case where the control means sets the neutral range, the control means may be adapted to form the non-transmission state by controlling the plurality of operation state switching means and the supply state switching means when the vehicle speed detected by the vehicle speed detecting means is smaller than a predetermined vehicle speed, whereas the control means is adapted to form the non-transmission state by controlling the plurality of operation state switching means when the vehicle speed detected by the vehicle speed detecting means is no less than the predetermined vehicle speed.

The control apparatus for the automatic transmission thus constructed is capable of cutting off the supply of the hydraulic oil to the operation state switching means by the supply state switching means when, for example, the vehicle stops, even if the operation states of the one or more friction engagement elements cannot be switched due to the malfunction of the corresponding operation state switching means. This results from the fact that the control means forms the non-transmission state by controlling the plurality of operation state switching means and the supply state switching means in the case where the vehicle speed detected by the vehicle speed detecting means is smaller than the predetermined vehicle speed. As a result, the rotational drive force from the driving source is prevented from being transmitted to the output shaft through the input shaft when the neutral range is set by the control means. Therefore the control apparatus for an automatic transmission thus constructed can prevent the behavior of the vehicle being inconsistent with the operation of the operating member by the driver, and can improve the safety as compared to that of the prior art. The control apparatus for an automatic transmission thus constructed is also capable of forming the non-transmission state, even if the hydraulic oil supplied to the plurality of operation state switching means cannot be cut off due to the malfunction of the supply state switching means, since the plurality of operation state switching means can switch the operation states of the friction engagement elements.

Meanwhile, the control apparatus for the automatic transmission thus constructed is capable of cutting off the supply of the hydraulic oil to the friction engagement elements by the plurality of operation state switching means when, for example, the vehicle is cruising, that is, in such case where the vehicle speed detected by the vehicle speed detecting means is no less than the predetermined vehicle speed. As a result, even if the operation states of the one or more friction engagement elements cannot be switched due to the malfunction of the corresponding operation state switching means, the behavior of the vehicle is consistent with the operation of the operating member by the driver in the case where the neutral range is set by the control means, as long as the vehicle is cruising. Therefore the driver can be prevented from feeling uncomfortable with the behavior of the vehicle. While there is no malfunction in any one of the plurality of operation state switching means, the immediate responsiveness of the friction engagement elements is improved, as compared to the case where the supply of the hydraulic oil to the friction engagement elements is cut off by the supply state switching means.

In the control apparatus for the automatic transmission as set forth in the above definition (1), (4) the control means may be adapted to control the plurality of operation state switching means and/or the supply state switching means to cut off supply of the hydraulic oil to the plurality of friction engagement elements, so as to form the non-transmission state.

The control apparatus for the automatic transmission thus constructed is capable of switching the operation states of the plurality of friction engagement elements from the engagement state to the disengagement state, by means of controlling the plurality of operation state switching means and/or the supply state switching means to cut off the supply of the hydraulic oil to the plurality of friction engagement elements, so as to form the non-transmission state.

In the control apparatus for the automatic transmission as set forth in the above definition (1), (5) each of the plurality of operation state switching means may be constituted by a linear solenoid valve, the linear solenoid valve enters the cut-off state in which supply of the hydraulic oil to corresponding the friction engagement element is cut off in a de-energized state, whereas the linear solenoid valve enters the supply state in which the hydraulic oil is supplied to corresponding the friction engagement element in an energized state.

The control apparatus for the automatic transmission thus constructed is capable of switching the operation states of the plurality of friction engagement elements in response to the electric signals outputted by the control means. Since the plurality of operation state switching means can cut off the supply of the hydraulic oil to the friction engagement elements in the de-energized state, the control apparatus for the automatic transmission according to the embodiments of this invention can cut off the supply of the hydraulic oil to the friction engagement elements and can form the non-transmission state, even in the case where the control means cannot properly output the electric signals to the one or more linear solenoid valves.

In the control apparatus for the automatic transmission as set forth in the above definition (1), (6) the plurality of operation state switching means may be provided closer to the plurality of friction engagement elements than the supply state switching means on hydraulic paths through which the hydraulic oil is supplied to the plurality of friction engagement elements.

In the control apparatus for the automatic transmission thus constructed, the plurality of operation state switching means are provided closer to the plurality of friction engagement elements than the supply state switching means on the hydraulic paths through which the hydraulic oil is supplied to the plurality of friction engagement elements. As a result, the operation states of the plurality of friction engagement elements can be rapidly set into the disengagement state in the case where the plurality of operation state switching means is controlled to cut off the supply of the hydraulic oil to the plurality of friction engagement elements, as compared to the case where the supply state switching means is controlled to cut off the supply of the hydraulic oil to the plurality of friction engagement elements. Therefore, the immediate responsiveness of the plurality of friction engagement elements is improved as compared to the case where the supply state switching means is controlled to cut off the supply of the hydraulic oil to the plurality of friction engagement elements.

In order to achieve the above-described aims, the control apparatus for the automatic transmission according to the present invention (7) comprises a speed change mechanism including an input shaft for inputting a rotational drive force from a driving source, an output shaft for transmitting the rotational drive force to a plurality of wheels, and a plurality of friction engagement elements, operation states of which being switched between an engagement state and a disengagement state, so as to change the speed of the rotation inputted from the input shaft and to output the rotation with the changed speed; a shift lever for selecting one of a plurality of shift ranges including a neutral range by being operated to one of a plurality of operation positions; a shift sensor for detecting one of the operation positions to where the shift lever is operated; a plurality of linear solenoid valves for switching the operation states of the plurality of friction engagement elements by regulating oil pressure of hydraulic oil which is supplied to the plurality of friction engagement elements; a vehicle speed sensor for detecting a vehicle speed of a vehicle; a switching valve for switching operation states between a supply state in which the hydraulic oil is supplied to the plurality of linear solenoid valves and a cut-off state in which supply of hydraulic oil to the plurality of linear solenoid valves is cut off; a solenoid valve for switching the operation states of the switching valve; and an electronic control unit for setting one selected from among the plurality of shift ranges on the basis of the operation position detected by the shift sensor, and for controlling, in accordance with the vehicle speed detected by the vehicle speed sensor, the plurality of linear solenoid valves and/or the solenoid valve when the shift lever is operated to one of the plurality of operation positions corresponding to the neutral range, thereby forming a non-transmission state where the rotational drive force is prevented from being transmitted to the output shaft from the input shaft.

The control apparatus for the automatic transmission thus constructed is capable of cutting off the supply of the hydraulic oil to the plurality of linear solenoid valves by the solenoid valve in the case where the neutral range is set by the electronic control unit, and when, for example, the vehicle stops, even if the operation states of the one or more friction engagement elements cannot be switched due to the malfunction of the corresponding linear solenoid valves. This results from the fact that the electronic control unit forms the non-transmission state by controlling selectively the plurality of linear solenoid valves or the solenoid valve in accordance with the vehicle speed detected by the vehicle speed sensor in the case where the neutral range is set. As a result, the rotational drive force from the driving source is prevented from being transmitted to the output shaft through the input shaft when the neutral range is set by the electronic control unit. Therefore the control apparatus for an automatic transmission thus constructed can prevent the behavior of the vehicle being inconsistent with the operation of the shift lever by the driver, and can improve the safety as compared to that of the prior art.

In the control apparatus for the automatic transmission as set forth in the above definition (7), (8) in the case where the electronic control unit sets the neutral range, the electronic control unit may be adapted to form the non-transmission state by controlling the solenoid valve when the vehicle speed detected by the vehicle speed sensor is smaller than a predetermined vehicle speed, whereas the electronic control unit is adapted to form the non-transmission state by controlling the plurality of linear solenoid valves when the vehicle speed detected by the vehicle speed sensor is no less than a predetermined vehicle speed.

The control apparatus for the automatic transmission thus constructed is capable of cutting off the supply of the hydraulic oil to the plurality of linear solenoid valves by the solenoid valve and the switching valve when, for example, the vehicle stops, even if the operation states of the one or more friction engagement elements cannot be switched due to the malfunction of the corresponding linear solenoid valves. This results from the fact that the electronic control unit forms the non-transmission state by controlling selectively the plurality of linear solenoid valves or the solenoid valve, selectively, in accordance with the vehicle speed detected by the vehicle speed sensor. As a result, the rotational drive force from the driving source is prevented from being transmitted to the output shaft through the input shaft when the neutral range is set by the electronic control unit. Therefore the control apparatus for an automatic transmission thus constructed can prevent the behavior of the vehicle being inconsistent with the operation of the shift lever by the driver, and can improve the safety as compared to that of the prior art.

Meanwhile, the control apparatus for the automatic transmission thus constructed is capable of cutting off the supply of the hydraulic oil to the friction engagement elements by the plurality of linear solenoid valves when, for example, the vehicle is cruising. As a result, even if the operation states of the one or more friction engagement elements cannot be switched due to the malfunction of the corresponding linear solenoid valves, the behavior of the vehicle is consistent with the operation of the shift lever by the driver in the case where the neutral range is set by the electronic control unit, as long as the vehicle is cruising. Therefore the driver can be prevented from feeling uncomfortable with the behavior of the vehicle. While there is no malfunction in any one of the plurality of linear solenoid valves, the immediate responsiveness of the friction engagement elements is improved when the shift range is set from the neutral range to one of the other ranges by the electronic control unit, as compared to the case where the supply of the hydraulic oil to the friction engagement elements is cut off by the solenoid valve and the switching valve.

In the control apparatus for the automatic transmission as set forth in the above definition (7), (9) in the case where the electronic control unit sets the neutral range, the electronic control unit may be adapted to form the non-transmission state by controlling the plurality of linear solenoid valves and the solenoid valve when the vehicle speed detected by the vehicle speed sensor is smaller than a predetermined vehicle speed, whereas the electronic control unit is adapted to form the non-transmission state by controlling the plurality of linear solenoid valves when the vehicle speed detected by the vehicle speed sensor is no less than a predetermined vehicle speed.

The control apparatus for the automatic transmission thus constructed is capable of cutting off the supply of the hydraulic oil to the plurality of linear solenoid valves by the solenoid valve and the switching valve when, for example, the vehicle stops, even if the operation states of the one or more friction engagement elements cannot be switched due to the malfunction of the corresponding linear solenoid valves. This results from the fact that the electronic control unit forms the non-transmission state by controlling the plurality of linear solenoid valves and the solenoid valve in the case where the vehicle speed detected by the vehicle speed sensor is smaller than the predetermined vehicle speed. As a result, the rotational drive force from the driving source is prevented from being transmitted to the output shaft through the input shaft when the neutral range is set by the electronic control unit. Therefore the control apparatus for an automatic transmission thus constructed can prevent the behavior of the vehicle being inconsistent with the operation of the shift lever by the driver, and can improve the safety as compared to that of the prior art. The control apparatus for an automatic transmission thus constructed is also capable of forming the non-transmission state, even if the hydraulic oil supplied to the plurality of linear solenoid valves cannot be cut off due to the malfunction of the solenoid valve, since the plurality of linear solenoid valves can switch the operation states of the friction engagement elements.

Meanwhile, the control apparatus for the automatic transmission thus constructed is capable of cutting off the supply of the hydraulic oil to the friction engagement elements by the plurality of linear solenoid valves when, for example, the vehicle is cruising, that is, while the vehicle speed detected by the vehicle speed sensor is no less than the predetermined vehicle speed. As a result, even if the operation states of the one or more friction engagement elements cannot be switched due to the malfunction of the corresponding linear solenoid valves, the behavior of the vehicle is consistent with the operation of the shift lever by the driver in the case where the neutral range is set by the electronic control unit, as long as the vehicle is cruising. Therefore the driver can be prevented from feeling uncomfortable with the behavior of the vehicle. While there is no malfunction in any one of the plurality of linear solenoid valves, the immediate responsiveness of the friction engagement elements is improved, as compared to the case where the supply of the hydraulic oil to the friction engagement elements is cut off by the solenoid valve and the switching valve.

In the control apparatus for the automatic transmission as set forth in the above definition (7), (10) the electronic control unit may be adapted to control the plurality of linear solenoid valves and/or the solenoid valve to cut off supply of the hydraulic oil to the plurality of friction engagement elements, so as to form the non-transmission state.

The control apparatus for the automatic transmission thus constructed is capable of switching the operation states of the plurality of friction engagement elements from the engagement state to the disengagement state, by means of controlling the plurality of linear solenoid valves and/or the solenoid valve to cut off the supply of the hydraulic oil to the plurality of friction engagement elements, so as to form the non-transmission state.

In the control apparatus for the automatic transmission as set forth in the above definition (7), (11) each of the plurality of linear solenoid valves may enter the cut-off state in which supply of the hydraulic oil to corresponding the friction engagement element is cut off in a de-energized state, whereas each of the plurality of linear solenoid valves may enter the supply state in which the hydraulic oil is supplied to corresponding the friction engagement element in an energized state.

The control apparatus for the automatic transmission thus constructed is capable of switching the operation states of the plurality of friction engagement elements in response to the electric signals outputted by the electronic control unit. Since the plurality of linear solenoid valves can cut off the supply of the hydraulic oil to the friction engagement elements in the de-energized state, the control apparatus for the automatic transmission according to the embodiments of this invention can cut off the supply of the hydraulic oil to the friction engagement elements and can form the non-transmission state, even in the case where the electronic control unit cannot properly output the electric signals to the linear solenoid valves.

In the control apparatus for the automatic transmission as set forth in the above definition (7), (12) the plurality of the linear solenoid valves may be provided closer to the plurality of friction engagement elements than the solenoid valve on hydraulic paths through which the hydraulic oil is supplied to the plurality of friction engagement elements.

In the control apparatus for the automatic transmission thus constructed, the plurality of linear solenoid valves are provided closer to the plurality of friction engagement elements than the solenoid valve and the switching valve on the hydraulic paths through which the hydraulic oil is supplied to the plurality of friction engagement elements. As a result, the operation states of the plurality of friction engagement elements can be rapidly set into the disengagement state in the case where the plurality of linear solenoid valves are controlled to cut off the supply of the hydraulic oil to the plurality of friction engagement elements, as compared to the case where the solenoid valve is controlled to cut off the supply of the hydraulic oil to the plurality of friction engagement elements. Therefore, the immediate responsiveness of the plurality of friction engagement elements is improved as compared to the case where the solenoid valve is controlled to cut off the supply of the hydraulic oil to the plurality of friction engagement elements.

Advantageous Effects of Invention

The present invention provides the control apparatus for the automatic transmission which is capable of preventing the friction engagement elements from being kept in the engagement state in response to the traveling state of the vehicle when the shift lever is operated to the position where the neutral range is formed, even if the malfunction of the one or more solenoid valves occurs.

BRIEF DESCRIPTION OF DRAWINGS

FIG. 4 is a graph showing operation states of friction engagement elements in the first embodiment of the present invention;

FIG. 7 is a graph showing operation states of solenoid valves and linear solenoid valves in the first embodiment of the present invention;

Figure 1:
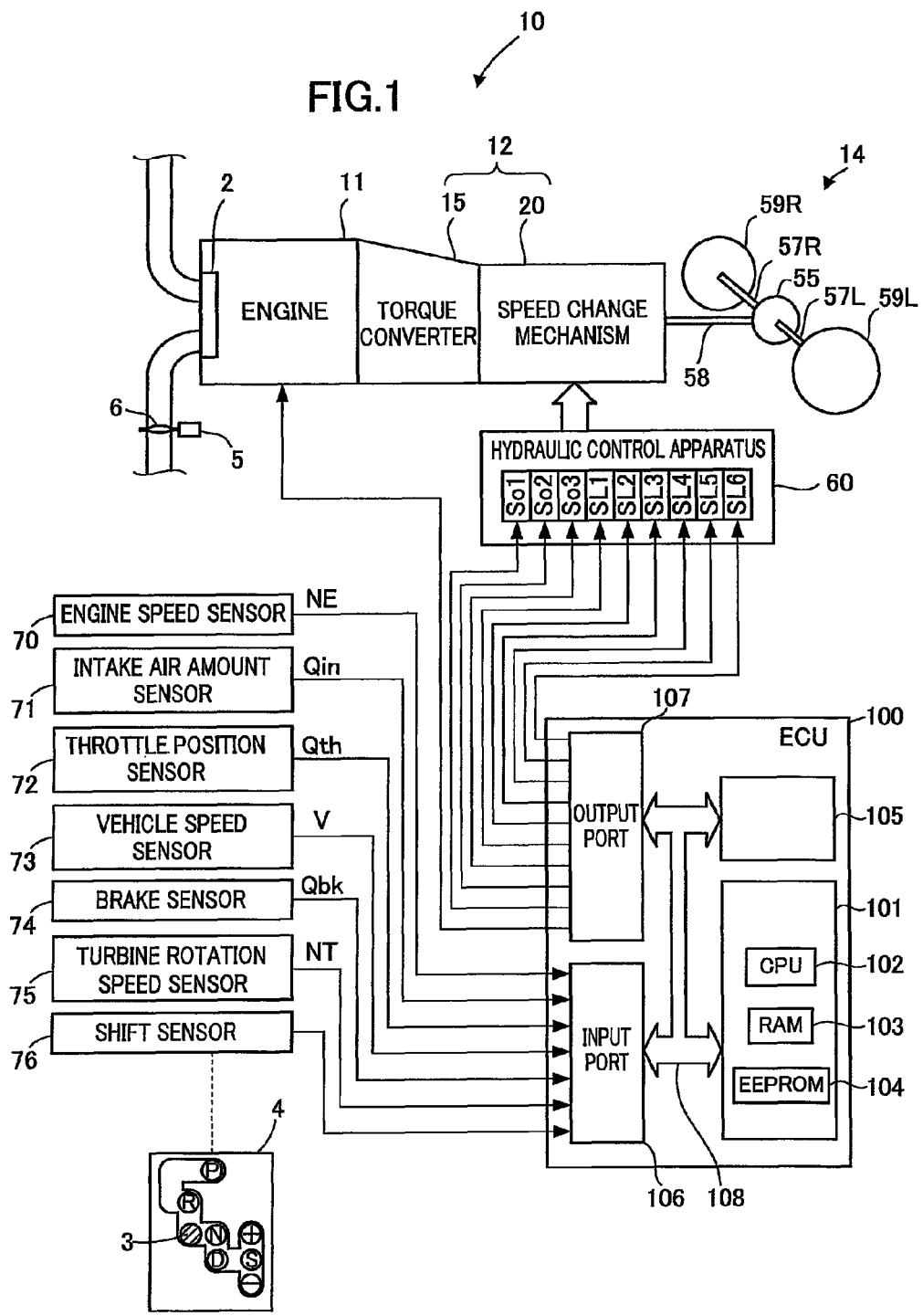
FIG. 1 is a block diagram showing a structure of a control apparatus for an automatic transmission according to the first embodiment of the present invention.

3: shift lever (operating member)
10: vehicle
11: engine
12: automatic transmission
15: torque converter
20: speed change mechanism
22: input shaft
24: first set
33: second set
56: output shaft
60: hydraulic control apparatus
70: engine speed sensor
71: intake air amount sensor
72: throttle position sensor
73: vehicle speed sensor (vehicle speed detecting means)
74: brake sensor
75: turbine rotation speed sensor
76: shift sensor (operation position detecting means)
84 to 89: oil pressure sensors
100: ECU (control means, electronic control unit)
101: main microcomputer
102: CPU
104: EEPROM
105: sub microcomputer
130: So3 solenoid valve (supply state switching means)
140: parking valve
150: switching valve (supply state switching means)
161 to 166: SL1 to SL6 linear solenoid valves (operation state switching means)

DESCRIPTION OF EMBODIMENTS

First Embodiment

The embodiment of the present invention will be described hereinafter with reference to the drawings.

Referring now to FIG. 1, there is shown the structure of a vehicle 10 in the present embodiment.

As shown in FIG. 1, the vehicle 10 comprises an engine 11 serving as a driving source, an automatic transmission 12 for automatically changing the speed of the rotation outputted from the engine 11, a transmission mechanism 14 for transmitting the rotation outputted from the automatic transmission 12 to a road surface, a hydraulic control apparatus 60 for controlling the automatic transmission 12 by using oil pressure, an ECU 100 constituting an electronic controller for electrically controlling the hydraulic control apparatus 60, and various kinds of sensors 70 to 76 for detecting signals to be outputted to the ECU 100.

The engine 11 is constituted by an internal combustion engine such as a gasoline engine and a diesel engine, and has a plurality of combustion chambers in a cylinder block. The engine 11 is adapted to burn an air/fuel mixture of air introduced into the combustion chambers through a throttle valve 6 driven by a throttle actuator, and fuel injected from an injector 2. The combustion chambers respectively have pistons received therein so that the pistons can be reciprocated at the time of the burning of the air/fuel mixture, thereby making it possible to rotate a crank shaft serving as an output shaft hereinafter described. The rotation of the crank shaft is adapted to be transmitted to the automatic transmission 12 as drive force. The above mentioned internal combustion engine may be replaced by an external combustion engine to serve as the driving source. The driving source may include an electric motor other than the combustion engine. The electric motor may be used together with the internal combustion engine to serve as an auxiliary driving source.

The automatic transmission 12 comprises a torque converter 15 serving as a hydraulic power transmission, and a speed change mechanism 20 functioning as a stepped transmission. Here, the speed change mechanism in the present invention is exemplified by a speed change mechanism 20 in the present embodiment as constituting part of the control apparatus for the automatic transmission according to the present invention.

The torque converter 15 is adapted to receive the drive force of the engine 11 through the crank shaft which becomes apparent as the description proceeds. The torque converter 15 is also adapted to increase the torque of the drive force and to transmit the increased torque to the speed change mechanism 20. The structure of the torque converter 15 will be described in greater detail hereinafter.

The speed change mechanism 20 includes a speed change gear having a planetary gear for transmitting the rotational drive force inputted from the engine, a plurality of friction engagement elements, the operation states of which are switched between an engagement state and a disengagement state. Here, the rotational drive force transmitted by the speed change gear is transmitted through power transmission paths, which are switched in accordance with the operation states of the plurality of friction engagement elements. The speed change mechanism 20 also includes an input shaft 22 and an output shaft 56. Since the power transmission paths are switched as described above, the speed change mechanism 20 can selectively decelerate or accelerate the rotation inputted to the input shaft 22 from the torque converter 15 at a predetermined gear ratio γ, and can output the selectively decelerated or accelerated rotation to the output shaft 56. The drive force outputted from the output shaft 56 of the speed change mechanism 20 is transmitted to drive wheels 59L, 59R through a propeller shaft 58, a differential mechanism 55, and drive shafts 57L, 57R. The structure of the speed change mechanism 20 will be described in greater detail hereinafter.

The transmission mechanism 14 comprises the propeller shaft 58 connected to the output shaft 56 hereinafter described of the speed change mechanism 20, the differential mechanism 55 for distributing the rotational drive force transmitted from the propeller shaft 58, the drive shafts 57L, 57R connected to the differential mechanism 55, and the drive wheels 59L, 59R for transmitting the rotational drive force transmitted from the drive shafts 57L, 57R to the road surface. The differential mechanism 55 is adapted to allow the drive wheels 59L, 59R to rotate at different speeds from each other, when the vehicle 10 is cruising on a curved road or the like.

The hydraulic control apparatus 60 includes a hydraulic pressure circuit for forming oil passages of hydraulic oil discharged from an oil pump driven by the rotation from the engine 11, So1 to So3 solenoid valves, and SL1 to SL6 linear solenoid valves for selectively switching the operation states of the plurality of friction engagement elements hereinafter described. The hydraulic control apparatus 60 is adapted to control the speed change operation of the speed change mechanism 20, and is adapted to control a parking lock mechanism hereinafter described. The structure of the hydraulic control apparatus 60 will be described in more detail hereinafter.

The ECU 100 includes a main microcomputer 101 constituting a main control unit, a sub microcomputer 105 constituting an auxiliary control unit, an input port 106 for receiving electric signals from various kinds of sensors, and an output port 107 for providing output signals from the main microcomputer 101 and the sub microcomputer 105 to the hydraulic control apparatus 60 and the engine 11. The main microcomputer 101, the sub microcomputer 105, the input port 106, and the output port 107 are connected together through a bidirectional bus 108. The main microcomputer 101 has a CPU (Central-Processing-Unit) 102, a RAM (Random-Access-Memory) 103, and an EEPROM (Electrically-Erasable-Programmable-Read-Only-Memory) 104.

The CPU 102 is adapted to process the several detected signals received from the input port 106 through an ADC (Analog-Digital-Converter) (not shown) according to the program stored in the EEPROM 104 with the use of the primary storage function of the RAM 103, thereby controlling the output of the engine 11, the speed change of the automatic transmission 12, and the like. The electric signals provided from the output port 107 are adapted to be inputted through the ADC (not shown) to controlled objects such as the engine 11, the So1 to So3 solenoid valves, the SL1 to SL6 linear solenoid valves.

The EEPROM 104 is adapted to store a speed change map showing how a shift stage corresponds to a vehicle speed and a throttle valve position indicating the opening degree of the throttle valve 6. The CPU 102 of the ECU 100 is adapted to determine the shift stage of the automatic transmission 12 on the basis of the detected signals of a vehicle speed sensor and a throttle position sensor hereinafter described, and the speed change map stored in the EEPROM 104, and is adapted to control the hydraulic control apparatus 60 to form the determined shift stage. More specifically, the CPU 102 of the ECU 100 is adapted to output the electric signals corresponding to the determined shift stage to the So1 to So3 solenoid valves and the SL1 to SL6 linear solenoid valves, thereby realizing the speed change of the automatic transmission 12.

The ECU 100 is adapted to selectively switch the operation states of each of the plurality of friction engagement elements between the engagement state and the disengagement state by outputting the electric signals to the So1 to So3 solenoid valves and the SL1 to SL6 linear solenoid valves of the hydraulic control apparatus 60. Here, the plurality of friction engagement elements constitutes part of the speed change mechanism 20. The operation states of the plurality of friction engagement elements can be switched by using the oil pressure which is derived from a line pressure generated by an oil pump hereinafter described. The ECU 100 is also adapted to control the hydraulic control apparatus 60 to selectively switch the operation states of the plurality of friction engagement elements. As a result, the automatic transmission 12 can form the desired shift stage by switching the power transmission paths of the rotational drive force outputted from the engine 11. Therefore the automatic transmission 12 can realize the speed change at the predetermined gear ratio γ.

The EEPROM 104 is adapted to store an operation table (see FIG. 4) of the plurality of friction engagement elements hereinafter described, an operation table of the plurality of solenoid valves and linear solenoid valves (see FIG. 7), an operation state judgment threshold, which is a threshold of the oil pressure to be supplied to each of the friction engagement elements, for judging the operation state of each of the friction engagement elements, and an N range forming method changing threshold Vn hereinafter described.

The sub microcomputer 105 has a CPU, a RAM, and an EEPROM (not shown), similar to the main microcomputer 101. The EEPROM of the sub microcomputer 105 is adapted to store a program for detecting errors in the process of the main microcomputer 101. The sub microcomputer 105 is adapted to control the output of the engine 11, the speed change of the automatic transmission 12, and the like, in place of the main microcomputer 101 when the sub microcomputer 105 detects the errors in the process of the main microcomputer 101.

The vehicle 10 further comprises an engine speed sensor 70 for detecting an engine rotation speed, i.e., the rotation speed of the output shaft of the engine 11, an intake air amount sensor 71 for detecting an intake air amount in the engine 11, a throttle position sensor 72 for detecting an opening degree of the throttle valve 6 adapted to adjust the intake air amount, a vehicle speed sensor 73 for detecting the vehicle speed V of the vehicle 10, a brake sensor 74, a turbine rotation speed sensor 75 for detecting a turbine rotation speed of the torque converter 15, that is, the rotation speed of the input shaft of the automatic transmission, a shift sensor 76 for detecting operation positions of a shift lever 3, and a plurality of oil pressure sensors hereinafter described.

The engine speed sensor 70 is adapted to generate a pulse serving as an output signal each time the rotation angles of a timing rotor (not shown) provided at the crank shaft hereinafter described reaches predetermined angles, and is adapted to output the output signal as a detected signal to the ECU 100. The ECU 100 is adapted to calculate the engine rotation speed NE on the basis of the detected signal.

The intake air amount sensor 71 is constituted by a hot wire type of air flow meter provided in a suction flow passage to the engine 11, and is adapted to output a detected signal indicating resistance of the hot wire, which is varied in response to the intake air amount Qin. The ECU 100 is adapted to calculate the intake air amount Qin on the basis of the resistance indicated by the detected signal.

The throttle position sensor 72 is constituted by a Hall effect device producing output voltage corresponding to the opening degree of the throttle valve 6 (the throttle valve position θth), and is adapted to output a detected signal indicating the output voltage of the Hall effect device. The ECU 100 is adapted to calculate the throttle valve position θth on the basis of the detected signal.

The vehicle speed sensor 73 is adapted to generate a pulse serving as an output signal each time the rotation angles of a timing rotor (not shown) provided at the output shaft 56 of the automatic transmission 12 reaches predetermined angles, and is adapted to output the output signal as a detected signal to the ECU 100. The ECU 100 is adapted to calculate the vehicle speed V of the vehicle 10 on the basis of the detected signal. Therefore, the vehicle speed sensor 73 in the present embodiment is adapted to detect the vehicle speed V of the vehicle 10. Here, the vehicle speed detecting means in the present invention is exemplified by the vehicle speed sensor 73 as constituting part of the control apparatus for the automatic transmission according to the present invention.

The brake sensor 74 is adapted to generate output voltage corresponding to a depression amount Qbk of a brake pedal (not shown) provided in the vehicle 10, and is adapted to output the output voltage as a detected signal to the ECU 100. The brake sensor 74 may be adapted to output to the ECU 100 a signal, i.e., a stepping force signal, which changes from an off-state to an on-state, when the brake pedal (not shown) is depressed by the driver with a predetermined depression amount.

The turbine rotation speed sensor 75 is adapted to generate a pulse serving as an output signal each time the rotation angles of a timing rotor (not shown) provided at an input shaft of the speed change mechanism 20 (hereinafter described) reaches predetermined angles, and is adapted to output the output signal as a detected signal to the ECU 100. The ECU 100 is adapted to calculate the turbine rotation speed NT on the basis of the detected signal.

The shift sensor 76 is constituted by a plurality of sensors. The sensors are provided in a shift operation apparatus 4 such that each of the sensors corresponds to each of the operation positions of the shift lever 3. When the shift lever 3 is operated by the driver, each of the sensors is adapted to detect the shift lever 3 and is adapted to output a detected signal to the ECU 100. Therefore, the shift sensor 76 is adapted to detect the operation position to which the shift lever 3 is operated. Here, the operation position detecting means in the present invention is exemplified by the shift sensor 76 as constituting part of the control apparatus for the automatic transmission according to the present invention. Incidentally, the operation position detecting means in the present invention may be constituted by, for example, momentary switches provided near a steering wheel in order to realize the switching between shift ranges or between shift stages.

Here, the shift lever 3 can be operated by the driver to one of the operation positions among a parking position for parking of the vehicle 10 (a parking range), a reverse travel position for reverse travel (a reverse range), a neutral position for realizing the disengagement state of the power transmission path in the automatic transmission 12 (a neutral range), a forward travel position for realizing an automatic transmission mode (a drive range), a manual transmission position (a sports range) indicating a manual position for shift operation in a manual transmission mode, an up-shift position (+) indicating an up-shift in the manual transmission mode, and a down-shift position (−) indicating a down-shift in the manual transmission mode.

The shift lever 3 is adapted to select any one of the plurality of shift ranges including the neutral range (hereinafter simply referred to as an N range) by being operated to one of the plurality of operation positions. Therefore, the operating member in the present invention is exemplified by the shift lever 3 in the present embodiment as constituting part of the control apparatus for the automatic transmission according to the present invention. Incidentally, the operating member in the present invention may be constituted by a paddle switch lever provided near the steering wheel in order to realize the switching between shift ranges or between shift stages.

When the driver operates the shift lever 3 to the manual transmission position, the detected signal indicating the manual transmission mode is outputted to the ECU 100. Therefore the ECU 100 can realize the speed change in response to the manual operation of the shift lever 3 by the driver. In the case of the manual operation, if the driver operates the shift lever 3 to the up-shift position (+) once, the ECU 100 controls the hydraulic control apparatus 60 so that the shift stage is up-shifted to one higher stage where the gear ratio γ is small. On the other hand, if the driver operates the shift lever 3 to the down-shift position (−) once, the ECU 100 controls the hydraulic control apparatus 60 so that the shift stage is down-shifted to one lower stage where the gear ratio γ is large.

Furthermore, the ECU 100 is capable of judging the current shift range and the current shift stage on the basis of the detected signal of the shift sensor 76.

The structure of the automatic transmission 12 in the present embodiment will be described hereinafter with reference to FIG. 2 and FIG. 3.

Figure 2:
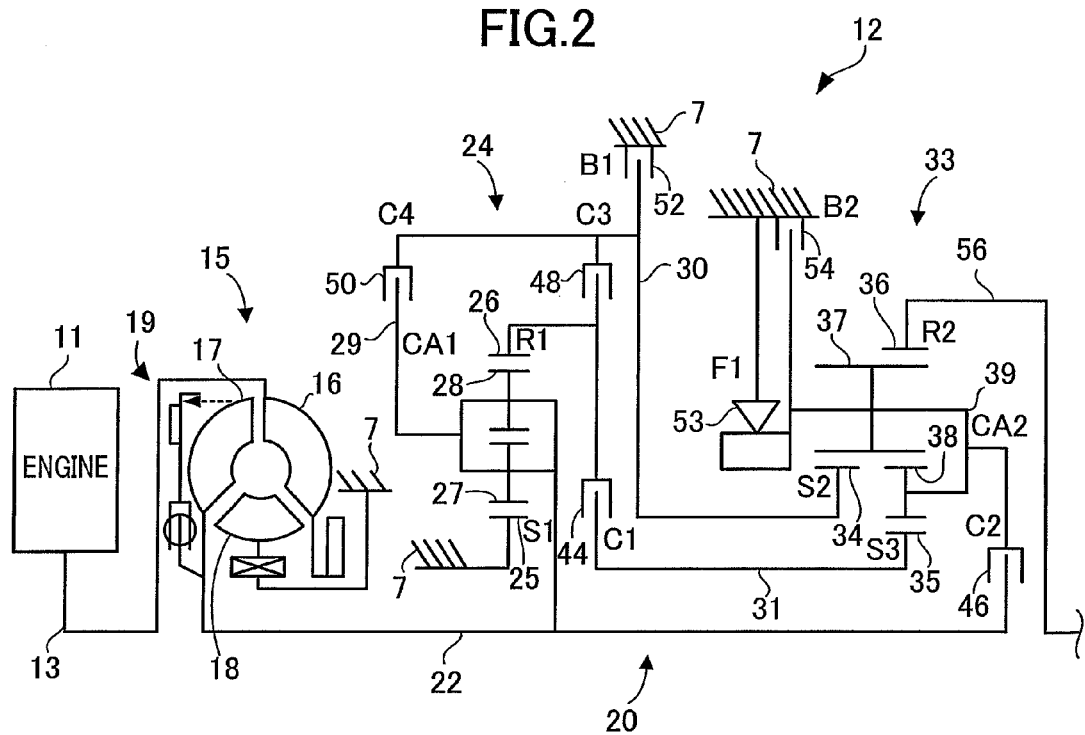
FIG. 2 is a schematic view showing a structure of an automatic transmission in the first embodiment of the present invention.

As shown in FIG. 2, the torque converter 15 has a pump impeller (hereinafter simply referred to as an impeller) 16 serving as an input member connected to the crank shaft 13, a turbine runner (hereinafter simply referred to as a turbine) 17 serving as an output member connected to the input shaft 22 of the speed change mechanism 20, and a stator 18 allowed to rotate in only one direction by means of a one-way clutch. Incidentally, the lower part of the automatic transmission 12 will not be illustrated since the automatic transmission 12 is nearly symmetrical about the input shaft 22.

The torque converter 15 is filled with oil serving as an operation fluid. The impeller 16 is adapted to transform rotation energy of the crank shaft 13 into fluid energy of the oil. The turbine 17 is adapted to extract the fluid energy of the oil by receiving the flow of the oil, thereby transmitting drive force. The oil used for rotating the turbine 17, which yet still contains a considerable amount of energy, is commutated by the stator 18, and again introduced into the impeller 16, so that the rotational drive force of the impeller 16 increases. As a result, the torque in the torque converter 15 is increased.

It has been known that the transmission efficiency of the torque converter 15 is low due to oil slip, since the torque converter 15 uses oil to transmit drive force. Therefore, the torque converter 15 has a lockup clutch 19 serving as a direct clutch. The lockup clutch 19 is adapted to mechanically and directly connect the impeller 16 with the turbine 17 when the lockup clutch 19 enters the engagement state by being pressed against a converter cover (not shown) co-rotatable with the impeller 16 by the hydraulic control. As a result, the lockup clutch 19 can improve the transmission efficiency of drive force transmitted from the engine 11 to the speed change mechanism 20.

The input shaft 22 of the speed change mechanism 20 is connected to the turbine 17 and receives the rotation of the crank shaft 13 through the impeller 16. Therefore, the input shaft 22 is adapted to receive the rotational drive force from the engine 11 through the torque converter 15.

Figure 3:
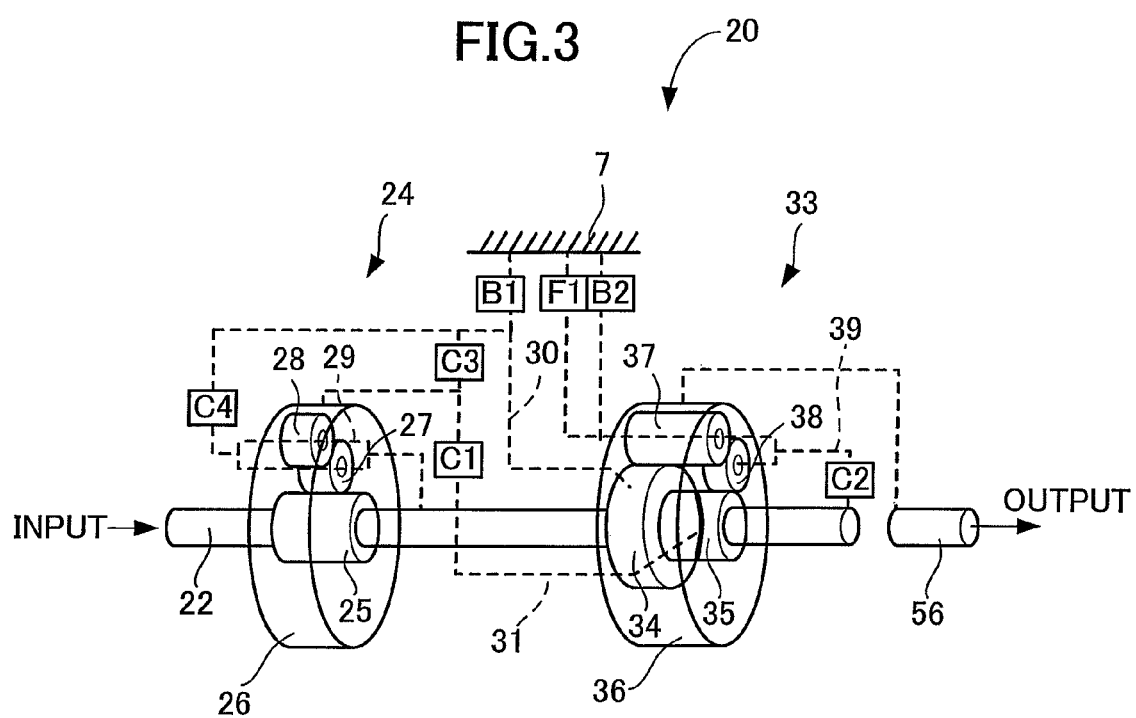
FIG. 3 is a perspective view that schematically showing a structure of an automatic transmission in the first embodiment of the present invention.

As shown in FIG. 2 and FIG. 3, the speed change mechanism 20 has a first set 24 constituted by a planetary gear mechanism, a second set 33 constituted by another planetary gear mechanism, a plurality of hydraulic friction engagement elements including a C1 clutch 44, a C2 clutch 46, a C3 clutch 48, a C4 clutch 50, a B1 brake 52, a B2 brake 54, an F1 one-way clutch 53, and the output shaft 56. Here, the C1 clutch 44, the C2 clutch 46, the C3 clutch 48, the C4 clutch 50, the B1 brake 52, and the B2 brake 54 constitutes the plurality of friction engagement elements according to the present invention.

The B1 brake 52 has a brake hub provided in a first drum 30, a drive plate provided to co-rotatable with the brake hub, and a driven plate provided in a case 7. When the B1 brake 52 has the driven plate fastened by a hydraulic actuator (hereinafter described), a friction material attached to the drive plate frictionally engages the driven plate, so that the B1 brake 52 enters the engagement state.

The first set 24 is a double pinion planetary gear having an S1 sun gear 25, an R1 ring gear 26, a plurality of inner pinion gears 27, a plurality of outer pinion gears 28, and a CA1 carrier 29.

The S1 sun gear 25 is fixed in the case 7 of the automatic transmission 12 so as not to rotate. The R1 ring gear 26 is held by the first drum 30 through the C3 clutch 48 so as to co-rotate with or to rotate relative to the first drum 30. The R1 ring gear 26 is also held by a second drum 31 (hereinafter described) through the C1 clutch 44 so as to co-rotate with or to rotate relative to the second drum 31.

The S1 sun gear 25 and the R1 ring gear 26 are positioned in face to face relationship with each other and forming an annular space therebetween. The plurality of inner pinion gears 27 and the plurality of outer pinion gears 28 are interposed in the annular space.

Each of the inner pinion gears 27 is adapted to mesh with its corresponding outer pinion gear 28 and with the S1 sun gear 25. Each of the outer pinion gears 28 is adapted to mesh with its corresponding inner pinion gear 27 and with the R1 ring gear 26. Each of the inner pinion gears 27 and each of the outer pinion gears 28 are held by a support shaft of the CA1 carrier 29 so as to rotate against the support shaft and to revolve against a center axis of the S1 sun gear 25. Therefore, each of the inner pinion gears 27 and each of the outer pinion gears 28 can rotate on the support shaft of the CA1 carrier 29 and can revolve around the input shaft 22.

The CA1 carrier 29 is adapted to hold each of the inner pinion gears 27 and each of the outer pinion gears 28 by the support shaft, so that each of the inner pinion gears 27 and each of the outer pinion gears 28 can rotate against the support shaft and can revolve against the center axis of the S1 sun gear 25. The center shaft of the CA1 carrier 29 is integrally connected to the input shaft 22. The support shaft of the CA1 carrier 29 for holding each of the inner pinion gears 27 and each of the outer pinion gears 28 is held by the first drum 30 through the C4 clutch 50 so as to co-rotate with or to rotate relative to the first drum 30.

The first drum 30 is rotatably disposed on the outer diameter side of the R1 ring gear 26, and is adapted to hold the R1 ring gear 26 through the C3 clutch 48 so that the R1 ring gear 26 can co-rotate with or can rotate relative to the first drum 30. The first drum 30 is also adapted to hold the CA1 carrier 29 through the C4 clutch 50 so that the CA1 carrier 29 can co-rotate with or can rotate relative to the first drum 30. Furthermore, the first drum 30 is held in the case 7 through the B1 brake 52 so as not to rotate or to rotate relative to the case 7.

The second drum 31 is arranged on the inner diameter side of the first drum 30, and is adapted to hold the R1 ring gear 26 through the C1 clutch 44 so that the R1 ring gear 26 can co-rotate with or can rotate relative to the second drum 31.

The second set 33 is a Ravigneaux type of planetary gear having an S2 sun gear 34, an S3 sun gear 35 whose diameter is smaller than that of the S2 sun gear 34, an R2 ring gear 36, a plurality of long pinion gears 37, a plurality of short pinion gears 38, a CA2 carrier 39, and the F1 one-way clutch 53.

The S2 sun gear 34 is connected to the first drum 30, and is connected to the R1 ring gear 26 through the C3 clutch 48 so as to co-rotate with or to rotate relative to the R1 ring gear 26. The S2 sun gear 34 is also connected to the CA1 carrier 29 through the C4 clutch 50 so as to co-rotate with or to rotate relative to the CA1 carrier 29. Furthermore, the S2 sun gear 34 can rotate on the input shaft 22.

The S3 sun gear 35 is connected to the second drum 31, and is connected to the R1 ring gear 26 through the C1 clutch 44 so as to co-rotate with or to rotate relative to the R1 ring gear 26. The S3 sun gear 35 can also rotate on the input shaft 22.

The R2 ring gear 36 is connected to the output shaft 56, and can rotate on the input shaft 22.

Each of the long pinion gears 37 is adapted to mesh with its corresponding short pinion gear 38, the S2 sun gear 34, and the R2 ring gear 36, while each of the short pinion gears 38 is adapted to mesh with its corresponding long pinion gear 37 and the S3 sun gear 35.

The S2 sun gear 34 and the S3 sun gear 35 are positioned in face to face relationship with the R2 ring gear 36 to form an annular space thereamong. The plurality of long pinion gears 37 are interposed in the annular space between the S2 sun gear 34 and the R2 ring gear 36, while the plurality of short pinion gears 38 are interposed in the annular space between the S3 sun gear 35 and the R2 ring gear 36. Furthermore, the plurality of long pinion gears 37 and the plurality of short pinion gears 38 are held by the CA2 carrier 39 to rotate and revolve. Therefore, each of the long pinion gears 37 and each of the short pinion gears 38 can rotate on the support shaft of the CA2 carrier 39 and can revolve around the input shaft 22.

The CA2 carrier 39 is adapted to hold each of the long pinion gears 37 and each of the short pinion gears 38 so that each of the long pinion gears 37 and each of the short pinion gears 38 can rotate and revolve. The center shaft of the CA2 carrier 39 is held by the input shaft 22 through the C2 clutch 46 so as to co-rotate with or to rotate relative to the input shaft 22. The support shaft of the CA2 carrier 39 for holding each of the long pinion gears 37 and each of the short pinion gears 38 is held in the case 7 through the B2 brake 54, so as not to rotate or to rotate relative to the case 7.

The C1 clutch 44 can be in one of the operation states among the engagement state where the S3 sun gear 35 can co-rotate with the R1 ring gear 26, and the disengagement state where the S3 sun gear 35 can rotate relative to the R1 ring gear 26.

The C2 clutch 46 can be in one of the operation states among the engagement state where the CA2 carrier 39 can co-rotate with the input shaft 22, and the disengagement state where the CA2 carrier 39 can rotate relative to the input shaft 22.

The C3 clutch 48 can be in one of the operation states among the engagement state where the R1 ring gear 26 can co-rotate with the first drum 30, and the disengagement state where the R1 ring gear 26 can rotate relative to the first drum 30.

The C4 clutch 50 can be in one of the operation states among the engagement state where the CA1 carrier 29 can co-rotate with the first drum 30, and the disengagement state where the CA1 carrier 29 can rotate relative to the first drum 30.

The B1 brake 52 can be in one of the operation states among the engagement state where the first drum 30 cannot rotate relative to the case 7, and the disengagement state where the first drum 30 can rotate relative to the case 7.

The B2 brake 54 can be in one of the operation states among the engagement state where the CA2 carrier 39 cannot rotate relative to the case 7, and the disengagement state where the CA2 carrier 39 can rotate relative to the case 7.

The F1 one-way clutch 53 is adapted to permit the rotation of the CA2 carrier 39 in only one direction.

The automatic transmission 12 thus constructed can change the shift range. Furthermore, when the shift range is set to the drive range (hereinafter simply referred to as a D range), the automatic transmission 12 can change the shift stage from the first speed (1st) to the eighth speed (8th), which becomes apparent as the description proceeds.

When the N range is set by the ECU 100 (hereinafter described), the speed change mechanism 20 of the automatic transmission 12 can form a non-transmission state where the rotational drive force is prevented from being transmitted from the input shaft 22 to the output shaft 56.

Referring now to FIG. 4, there is shown the operation states of the friction engagement elements in the present embodiment.

In FIG. 4, "◯" and "X" indicate the engagement state and the disengagement state respectively. "⊚" indicates that the engagement state occurs only when an engine brake is used. "Δ" indicates that the engagement state occurs only when the engine is driven.

Figure 5:
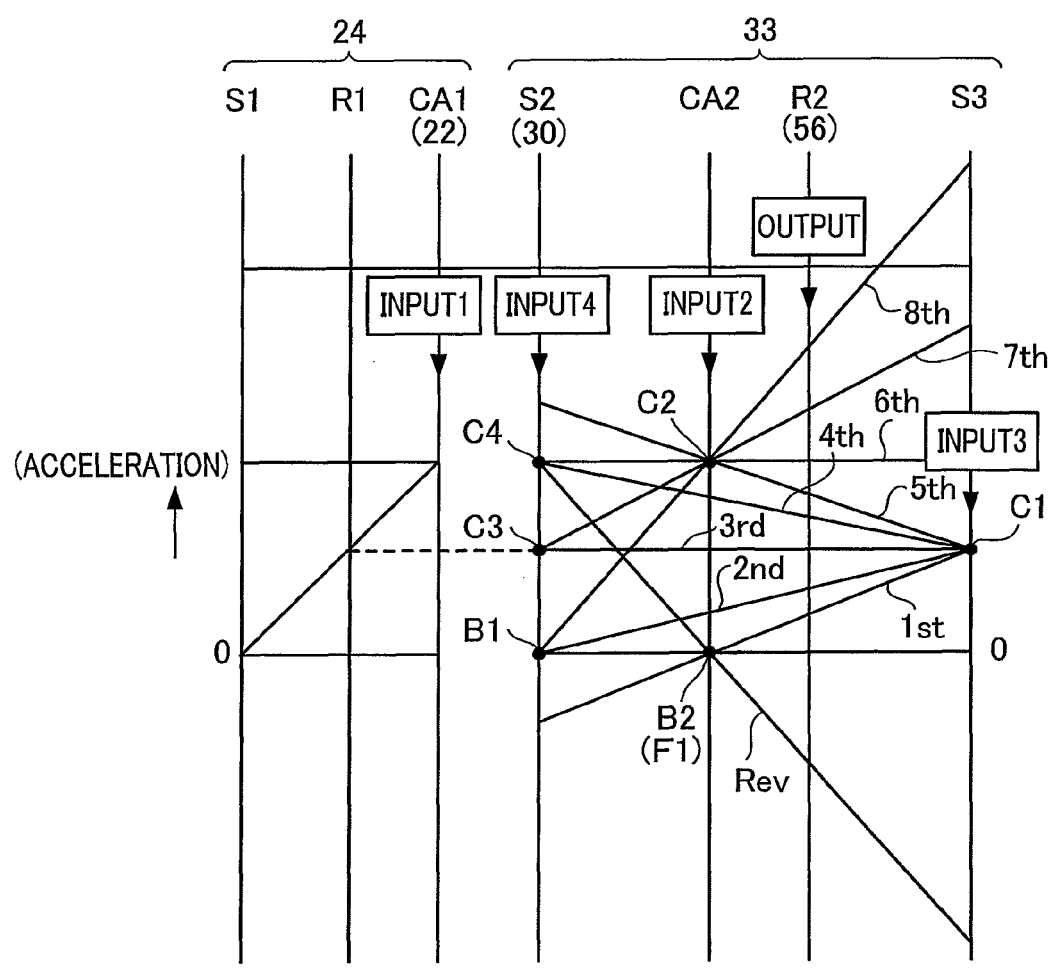
FIG. 5 is a speed diagram showing rotation speed ratios between constituent elements of planetary gear mechanisms in each shift stage in the first embodiment of the present invention.

FIG. 5 is a speed diagram showing how the shift stages (1st to 8th, R), which is formed corresponding to the operation states of the C1 to C4 clutches, the B1 and B2 brakes, and the F1 one-way clutch 53, relates to rotation speed ratios between each of the constituent elements in the first set 24 and the second set 33.

In FIG. 5, vertical axes represent the speed ratios between each of the constituent elements in the first set 24 and the second set 33. The interval between each of two adjacent vertical axes is determined corresponding to gear ratios between each of the constituent elements. Here, "C1", "C2", "C3", "C4", "B1", "B2", and "F1" represent the points where the C1 to C4 clutches, the B1 and B2 brakes, and the F1 one-way clutch are engaged respectively.

"Input 1", "Input 2", "Input 3", and "Input 4" shown in FIG. 5 indicate input positions where the rotational drive force is inputted from the input shaft 22 while "Output" shown in FIG. 5 indicates an output position where the rotational drive force is outputted to the output shaft 56.

Referring back again to FIG. 4, the ECU 100 is adapted to control whether or not the So1 to So3 solenoid valves, the SL1 to SL6 linear solenoid valves, a transmission solenoid (not shown), and the like, which are provided in the hydraulic control apparatus 60 (see FIG. 1), are magnetized in accordance with the combination of the operation states of the friction engagement elements. As a result, the automatic transmission 12 can selectively form the plurality of shift ranges or the shift stages by switching the operation states of the C1 to C4 clutches, and the B1 and B2 brakes.

When the current shift range of the automatic transmission 12 is the D range, which is the forward travel position for realizing the automatic transmission mode, the ECU 100 is adapted to control the automatic transmission 12 to form any one of the shift stages among from the 1st (the first speed) shift stage to the 8th (the eighth speed) shift stage on the basis of the vehicle speed, the throttle valve position, and the speed change map stored in the EEPROM 104. Therefore, the ECU 100 is adapted to control the automatic transmission 12 so that the automatic transmission 12 form the 4th shift stage when the traveling state of the vehicle 10 determined by the vehicle speed and the throttle valve position exceeds, for example, the 3-4 up-shift line in the speed change map stored in the EEPROM 104. In this case, the ECU 100 controls the hydraulic control apparatus 60 so that the C1 clutch 44 and the C4 clutch 50 enter the engagement state, thereby controlling the automatic transmission 12 to form the 4th shift stage. Thus the ECU 100 is adapted to control the hydraulic control apparatus 60 to realize the operation states of the C1 to C4 clutches, and the B1 and B2 brakes in accordance with the shift stage as shown in FIG. 4, in the case of the forward travel position for realizing the automatic transmission mode.

The ECU 100 is also adapted to control the hydraulic control apparatus 60 to realize the operation states of the C1 to C4 clutches, and the B1 and B2 brakes in accordance with the shift range selected by the driver as shown in FIG. 4, in the case of the shift range other than the D range.

The ECU 100 is also adapted to control the hydraulic control apparatus 60 to realize the operation states of the C1 to C4 clutches, and the B1 and B2 brakes in accordance with the indicated shift stage as shown in FIG. 4, when the manual transmission mode, that is, the manual transmission position (the sports range) is selected by the driver. When, for example, the down-shift from 4th to 3rd is indicated by the operation of the shift lever 3 (see FIG. 1) by the driver, the ECU 100 is adapted to control the hydraulic control apparatus 60 so that the C4 clutch 50 enters the disengagement state while the C3 clutch 48 enters the engagement state.

Figure 6:
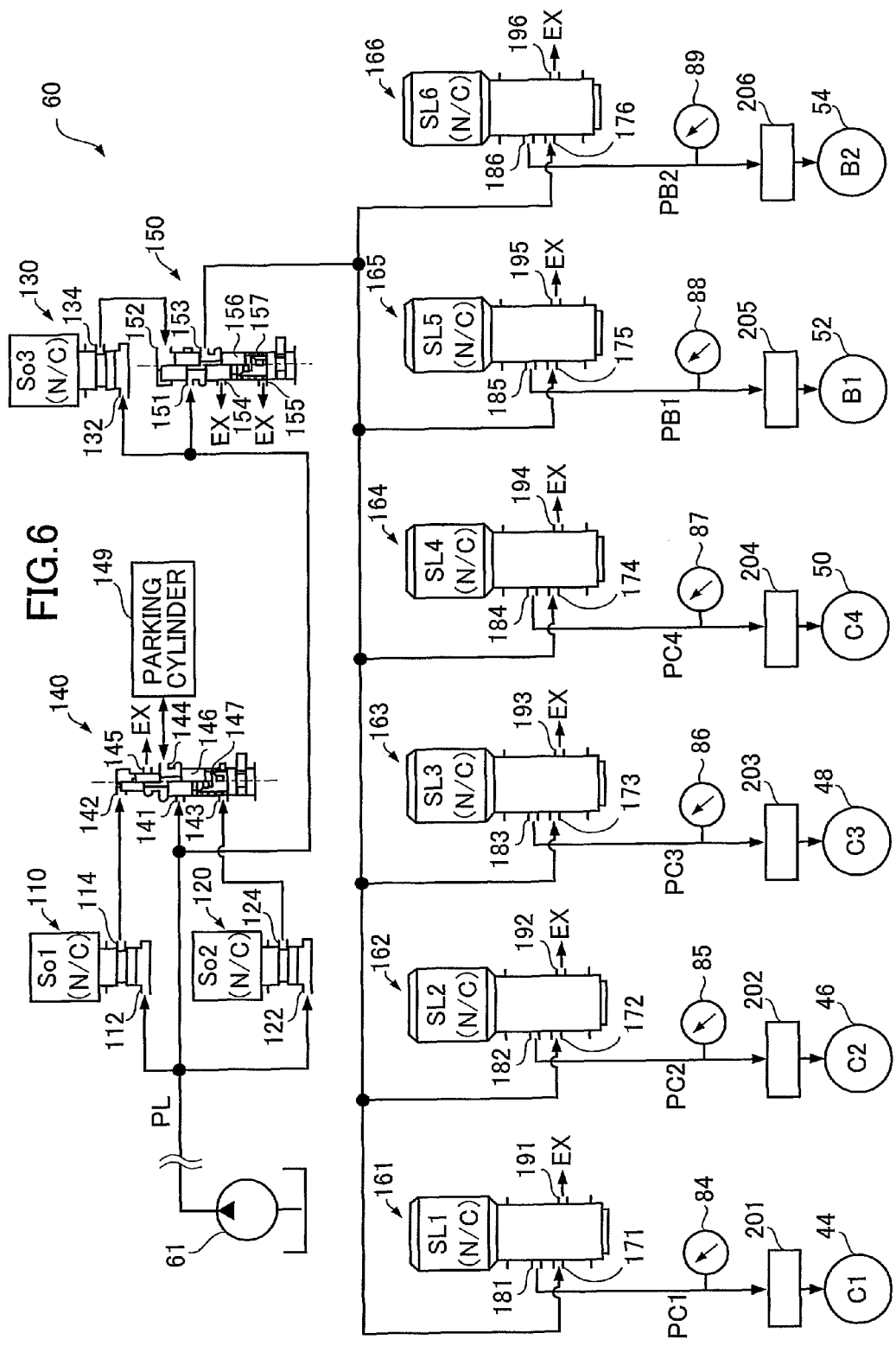
FIG. 6 is a schematic view showing a structure of a hydraulic control apparatus in the first embodiment of the present invention.

Referring now to FIGS. 6 and 7, the hydraulic control apparatus 60 in the present embodiment will be described. Here, "○" in each of the columns of the operation table shown in FIG. 7 indicates an energized state where an electrical current is applied to the corresponding solenoid valve or linear solenoid valve, while "X" indicates a de-energized state where no electrical current is applied to the corresponding solenoid valve or linear solenoid valve. "N/C (Normally-Closed)" indicates that the corresponding solenoid valve or linear solenoid valve is in the closed state in the de-energized state.

As shown in FIG. 6, the hydraulic control apparatus 60 comprises an oil pump 61 of trochoidal type, which is directly or indirectly connected to the crank shaft 13 (see FIG. 2) of the engine 11, a parking valve 140 for supplying a line pressure PL to a parking cylinder 149 to lock the rotation of the propeller shaft 58 (see FIG. 1), a switching valve 150 for switching selectively the operation states between a supply state in which the line pressure PL is supplied to the C1 to C4 clutches, the B1 and B2 brakes and a cut-off state in which the supply of the line pressure PL to the C1 to C4 clutches, the B1 and B2 brakes is cut off, an So1 solenoid valve 110 and an So2 solenoid valve 120 for selecting the operation states of the parking valve 140, an So3 solenoid valve 130 for selecting the operation states of the switching valve 150, the SL1 to SL6 linear solenoid valves 161 to 166 for regulating the line pressure PL which is the oil pressure of hydraulic oil supplied to the C1 to C4 clutches, and the B1 and B2 brakes.

The oil pump 61 is adapted to be interlocked with the rotation of the crank shaft 13, and thereby outputting the oil pressure. The oil pressure outputted from the oil pump 61 is regulated to the line pressure PL by means of, for example, a regulator valve. Then the hydraulic oil regulated in pressure is inputted to each of the solenoid valves on a hydraulic path through which the regulated hydraulic oil is supplied to the plurality of friction engagement elements.

The So1 to So3 solenoid valves 110 to 130 are adapted to switch between the open and the closed state, when the energized state and the de-energized state of the So1 to So3 solenoid valves 110 to 130 are switched separately by the ECU 100.

The So1 solenoid valve 110 has an input port 112 and an output port 114. The input port 112 is adapted to be inputted to the line pressure PL. The So1 solenoid valve 110 is switched to the open state when the electrical current is applied thereto by the ECU 100, thereby outputting the line pressure PL inputted from the input port 112 through the output port 114.

The So2 solenoid valve 120 has an input port 122 and an output port 124. The input port 122 is adapted to be inputted to the line pressure PL. The So2 solenoid valve 120 is switched to the open state when the electrical current is applied thereto by the ECU 100, thereby outputting the line pressure PL inputted from the input port 122 through the output port 124.

The parking valve 140 has input ports 141 to 143, an output port 144, a drain port 145, a spool 146, and a spring 147. The input port 141 is adapted to be inputted to the line pressure PL. The input port 142 is adapted to be inputted to the line pressure PL outputted from the output port 114 of the So1 solenoid valve 110. The input port 143 is adapted to be inputted to the line pressure PL outputted from the output port 124 of the So2 solenoid valve 120.

The parking valve 140 is also adapted to output the line pressure PL inputted to the input port 141 by the oil pump 61 in accordance with the position of the spool 146.

The parking cylinder 149 shown in FIG. 6 is a member partly constituting a well-known parking lock mechanism. The parking lock mechanism is provided near the output shaft 56 (see FIG. 1). When the oil pressure in the parking cylinder 149 is lower than a predetermined value, the parking cylinder 149 enters a lock state where the rotation of the output shaft 56 is prohibited. When the oil pressure in the parking cylinder 149 is no less than the predetermined value, the parking cylinder 149 enters an unlock state where the rotation of the output shaft 56 is allowed.

Here, FIG. 6 shows the position of the spool of the parking valve 140 and the switching valve 150. In FIG. 6, the right hand side of the parking valve 140 and the switching valve 150 shows that the spool is in the lower end position, while the left hand side of the parking valve 140 and the switching valve 150 shows that the spool is in the upper end position.

The spool 146 is moved to the lower end position against the urging force of the spring 147 by the line pressure PL inputted to the input port 142 from the output port 114 of the So1 solenoid valve 110, when the So1 solenoid valve 110 is in the open state and the So2 solenoid valve 120 is in the closed state. As a result, the input port 141 communicates with the output port 144. Therefore, the parking valve 140 enters the supply state for supplying the line pressure PL inputted to the input port 141 to the parking cylinder 149 through the output port 144. Accordingly, the oil pressure in the parking cylinder 149 increases, and the parking lock mechanism enters the unlock state.

Once the spool 146 moves to the lower end position, the spool 146 can not move to the upper end position as long as the line pressure PL is not supplied to the input port 143 of the parking valve 140 from the output port 124 of the So2 solenoid valve 120, because of the fact that the area of the upper end of the spool 146 is not equal to that of the lower end of the spool 146. As a result, as is apparent from the operation table of the solenoid valves and the linear solenoid valves shown in FIG. 7, the spool 146 does not move to the upper end position in the shift stages ranging from 2nd to 8th, when the supply to the input port 142 is stopped by closing the So1 solenoid valve 110. Therefore, the parking valve 140 maintains the supply state, so that the parking lock mechanism can maintain the unlock state without entering the lock state.

When the shift range is set to the parking range, the electrical current is applied to the So2 solenoid valve 120, as is apparent from the operation table of the solenoid valves and the linear solenoid valves shown in FIG. 7. As a result, the So2 solenoid valve 120 is switched to the open state. Therefore, the oil pressure is supplied to the input port 143 of the parking valve 140 from the output port 124 of the So2 solenoid valve 120, so that the spool 146 moves to the upper end position. When the spool 146 moves to the upper end position, the communication between the input port 141 and the output 144 is cut off, so that the parking valve 140 enters the cut-off state in which the line pressure PL is not supplied to the parking cylinder 149. When the parking valve 140 enters the cut-off state, the output port 144 communicates with the drain port 145, so that the oil pressure in the parking cylinder 149 is released through the drain port 145.

Accordingly, the hydraulic oil in the parking cylinder 149 is discharged from the drain port 145, resulting in the parking lock mechanism entering the lock state.

The So3 solenoid valve 130 has an input port 132 and an output port 134. The input port 132 is adapted to be inputted to the line pressure PL. The So3 solenoid valve 130 is switched to the open state when the electrical current is applied thereto by the ECU 100, thereby outputting the line pressure PL inputted from the input port 132 through the output port 134.

The switching valve 150 has input ports 151, 152, an output port 153, drain ports 154, 155, a spool 156, and a spring 157. The switching valve 150 is adapted to output the line pressure PL inputted to the input port 151 from the output port 153 to each of the linear solenoid valves 161 to 166 in accordance with the position of the spool 156.

Here, the spool 156 is held at the upper end position by the urging force of the spring 157 when the So3 solenoid valve 110 is in the closed state, due to the line pressure PL not inputted to the input port 152. When the spool 156 is held at the upper end position, the switching valve 150 enters the supply state for supplying the line pressure PL inputted to the input port 151 to the SL1 to SL6 linear solenoid valves 161 to 166 through the output port 153, since the input port 151 communicates with the output port 153.

When the So3 solenoid valve 130 is in the open state, the spool 156 is moved to the lower end position against the urging force of the spring 157 by the line pressure PL inputted to the input port 152. When the spool 156 is held at the lower end position, the switching valve 150 enters the cut-off state in which the line pressure PL is not outputted from the output port 153, since the communication between the input port 151 and the output 153 is cut off.

As described above, the switching valve 150 can enter the supply state in which the hydraulic oil is supplied to each of the linear solenoid valves 161 to 166, or can enter the cut-off state in which the supply of hydraulic oil to each of the linear solenoid valves 161 to 166 is cut off. The So3 solenoid valve 130 can select the operation states of the switching valve 150 between the supply state and the cut-off state. When the operation states of the switching valve 150 is switched from the supply state to the cut-off state by the So3 solenoid valve 130, the hydraulic oil is prevented from being supplied to each of the linear solenoid valves 161 to 166, so that the C1 to C4 clutches and the B1 and B2 brakes enter the disengagement state, and that the non-transmission state is realized in the speed change mechanism 20.

In other words, the So3 solenoid valve 130 and the switching valve 150 are adapted to switch selectively between the supply state in which the hydraulic oil is supplied to each of the linear solenoid valves 161 to 166, and the cut-off state in which the supply of hydraulic oil to each of the linear solenoid valves 161 to 166 is cut off. Therefore, the supply state switching means in the present invention is exemplified by the So3 solenoid valve 130 and the switching valve 150 in the present embodiment as constituting part of the control apparatus for the automatic transmission according to the present invention. Incidentally, the So3 solenoid valve 130 and the switching valve 150 may be replaced by one solenoid valve.

Each of the linear solenoid valves 161 to 166 is arranged to correspond to the C1 clutch 44, the C2 clutch 46, the C3 clutch 48, the C4 clutch 50, the B1 brake 52, and the B2 brake 54 respectively. The linear solenoid valves 161 to 166 have input ports 171 to 176, output ports 181 to 186, and drain ports 191 to 196 respectively.

The opening degree of each of the linear solenoid valves 161 to 166 is adapted to change continuously by means of the ECU 100, which controls the electrical current applied to the linear solenoid valves 161 to 166 respectively. Thus the linear solenoid valves 161 to 166 can regulate the line pressure PL inputted from the input ports 171 to 176 in accordance with the electrical current from the ECU 100, thereby outputting the regulated line pressure through the output ports 181 to 186 respectively.

Accordingly, the linear solenoid valves 161 to 166 are adapted to switch the operation states of the C1 to C4 clutches and the B1 and B2 brakes by regulating the line pressure PL to be supplied to the C1 to C4 clutches and the B1 and B2 brakes respectively.

Each of the linear solenoid valves 161 to 166 is adapted to enter the cut-off state in which the supply of hydraulic oil to the C1 to C4 clutches and the B1 and B2 brakes is cut off in the de-energized state, and to enter the supply state in which the hydraulic oil is supplied to the C1 to C4 clutches and the B1 and B2 brakes in the energized state. As mentioned above, the operation state switching means in the present invention is exemplified by the linear solenoid valves 161 to 166 in the present embodiment as constituting part of the control apparatus for the automatic transmission according to the present invention.

Each of the above mentioned linear solenoid valves 161 to 166 may be replaced by solenoid valves. Whether or not the linear solenoid valves 161 to 166 are replaced by the solenoid valves is determined in accordance with the structure of the automatic transmission 12 and the hydraulic control apparatus 60.

Furthermore, the linear solenoid valves 161 to 166 are provided closer to the C1 to C4 clutches and the B1 and B2 brakes than the So3 solenoid valve 130 and the switching valve 150 on the hydraulic path through which the line pressure PL is supplied to the C1 to C4 clutches and the B1 and B2 brakes.

The hydraulic control apparatus 60 comprises a C1 actuator 201, a C2 actuator 202, a C3 actuator 203, a C4 actuator 204, a B1 actuator 205, and a B2 actuator 206, each of which is constituted by a hydraulic actuator (hydraulic cylinder). Each of the actuators 201 to 206 is adapted to be operated by the oil pressure of the hydraulic oil, and is adapted to switch the operation states of the C1 to C4 clutches and the B1 and B2 brakes between the engagement state and the disengagement state in accordance with the oil pressure.

More specifically, when the C1 to C4 clutches and the B1 and B2 brakes enter the engagement state, the linear solenoid valves 161 to 166 enter the supply state where the input ports 171 to 176 communicate with the output ports 181 to 186 respectively, while the output ports 181 to 186 do not communicate with the drain ports 191 to 196 respectively. The actuators 201 to 206 increase the volume of the hydraulic cylinders by the oil pressure PC1, PC2, PC3, PC4, PB1, and PB2 supplied from the linear solenoid valves 161 to 166 respectively. As a result, the actuators 201 to 206 allow the C1 to C4 clutches and the B1 and B2 brakes to enter the engagement state.

On the other hand, when the C1 to C4 clutches and the B1 and B2 brakes enter the disengagement state, the linear solenoid valves 161 to 166 enter the cut-off state, by the control of the ECU 100, where the input ports 171 to 176 do not communicate with the output ports 181 to 186 respectively, while the output ports 181 to 186 communicate with the drain ports 191 to 196 respectively. When the linear solenoid valves 161 to 166 enter the cut-off state, the hydraulic oil in the hydraulic cylinders of the actuators 201 to 206 is discharged from the drain ports 191 to 196. Therefore, the volume of the hydraulic Cylinders of the actuators 201 to 206 decreases. As a result, the actuators 201 to 206 allow the C1 to C4 clutches and the B1 and B2 brakes to enter the disengagement state.

The opening degree of each of the linear solenoid valves 161 to 166 is adapted to change continuously between the supply state and the cut-off state by means of the ECU 100 controlling solenoid current applied to each of the linear solenoid valves 161 to 166. Accordingly, each of the linear solenoid valves 161 to 166 can regulate the oil pressure to be supplied to the actuators 201 to 206.

The hydraulic control apparatus 60 is provided with oil pressure sensors 84 to 89. The oil pressure sensors 84 to 89 are adapted to detect the oil pressure PC1 to PB2, and to output the detected signals indicating the oil pressure PC1 to PB2 to the ECU 100. The ECU 100 is adapted to obtain the oil pressure PC1 to PB2 on the basis of the detected signals. The ECU 100 can judge the operation states of the C1 to C4 clutches and the B1 and B2 brakes on the basis of the oil pressure PC1 to PB2 by referring to the operation state judgment threshold (not shown) stored in the EEPROM 104. Therefore, the ECU 100 can also judge the shift range and the shift stage on the basis of the operation states of the C1 to C4 clutches and the B1 and B2 brakes by referring to the operation table (see FIG. 4) of the friction engagement elements. Here, the operation table is mapped and stored in the EEPROM 104.

The ECU 100 is adapted to change the opening, degrees of the So1 to So3 solenoid valves 110 to 130 and the linear solenoid valves 161 to 166 by controlling the solenoid current applied thereto respectively on the basis of the operation table (see FIG. 7) of the solenoid valves and the linear solenoid valves. Accordingly, the ECU 100 can switch the operation states of the C1 to C4 clutches and the B1 and B2 brakes, thereby forming the desired shift range or shift stage in the automatic transmission 12.

As described above, the vehicle 10 in the present embodiment employs the SBW (Shift-By-Wire) system in which the ECU 100 executes the speed change control by controlling, for example, whether or not the above mentioned solenoid valves are magnetized. In particular, the vehicle 10 in the present embodiment employs the system in which the hydraulic control apparatus 60 has no conventional manual valve.

The function of the ECU 100 partly constituting the present embodiment of the control apparatus for the automatic transmission will be described hereinafter.

The ECU 100 is adapted to set one selected from among the plurality of shift ranges on the basis of the operation position detected by the shift sensor 76, and is adapted to output the electric signals for controlling predetermined friction engagement elements among the C1 to C4 clutches and the B1 and B2 brakes in accordance with the set shift range.

The ECU 100 is adapted to set any one of the shift stages among the 1st to 8th shift stages in the D range on the basis of the vehicle speed V detected by the vehicle speed sensor 73 and the throttle valve position θth detected by the throttle position sensor 72, with referring the speed change map (not shown) stored in the EEPROM 104. The ECU 100 is also adapted to up-shift the shift stage by one higher stage where the gear ratio γ is small, and to set the up-shifted shift stage, each time the shift sensor 76 detect that the shift lever 3 is operated to the up-shift position (+) once in the sports range.

The ECU 100 is also adapted to down-shift the shift stage by one lower stage where the gear ratio γ is large, and to set the down-shifted shift stage, each time the shift lever 3 is operated to the down-shift position (−) once in the sports range.

The ECU 100 selects the friction engagement elements corresponding to the shift range or the shift stage thus set by referring the operation table of the friction engagement elements mapped and stored in the EEPROM 104 (see FIG. 4). The ECU 100 is also adapted to output the electric signals to the So1 to So3 solenoid valves 110 to 130 and the linear solenoid valves 161 to 166 to form the selected shift range or shift stage. Therefore, the control means and an electronic control unit in the present invention is exemplified by the ECU 100 in the present embodiment as constituting part of the control apparatus for the automatic transmission according to the present invention.

When the shift lever 3 is operated to the operation position corresponding to the N range, the ECU 100 is adapted to form the non-transmission state where the rotational drive force is prevented from being transmitted to the output shaft 56 from the input shaft 22 of the speed change mechanism 20, by controlling the linear solenoid valves 161 to 166, thereby forming the N range.

More specifically, when the shift lever 3 is operated to the operation position corresponding to the N range, the ECU 100 is adapted to cut off the communication between the input ports 171 to 176 and the output ports 181 to 186 of the linear solenoid valves 161 to 166 respectively, and establishes the communication between the output ports 181 to 186 and the drain ports 191 to 196 respectively. Accordingly, the ECU 100 is adapted to disengage the oil pressure in the cylinders of the actuators 201 to 206 from the drain ports 191 to 196, so that the C1 to C4 clutches and the B1 and B2 brakes enter the disengagement state, thereby forming the non-transmission state where the rotational drive force is prevented from being transmitted to the output shaft 56 from the input shaft 22 of the speed change mechanism 20.

The ECU 100 forms the non-transmission state by controlling each of the linear solenoid valves 161 to 166 and/or both the So3 solenoid valve 130 and the switching valve 150 in accordance with the vehicle speed V detected by the vehicle speed sensor 73 when the shift lever 3 is operated to the operation position corresponding to the N range.

More specifically, in the case where the shift lever 3 is operated to the operation position corresponding to the N range, the ECU 100 forms the non-transmission state by controlling the So3 solenoid valve 130 and the switching valve 150 when the vehicle speed V detected by the vehicle speed sensor 73 is smaller than the N range forming method changing threshold Vn, while the ECU 100 forms the non-transmission state by controlling each of the linear solenoid valves 161 to 166 when the vehicle speed V detected by the vehicle speed sensor 73 is no less than the N range forming method changing threshold Vn.

Here, the N range forming method changing threshold Vn is an experimentally predetermined value defined by a vehicle speed in which the driver can be prevented from feeling uncomfortable with the behavior of the vehicle 10, when the D range is held due to the malfunction of the linear solenoid valves 161 to 166 despite the fact that the shift range is changed from the D range to the N range by the operation of the shift lever 3 by the driver.

The ECU 100 is adapted to control each of the linear solenoid valves 161 to 166 and/or both the So3 solenoid valve 130 and the switching valve 150, so that the supply of the hydraulic oil to the C1 to C4 clutches and the B1 and B2 brakes is cut off, so as to foam the non-transmission state.

Figure 8:
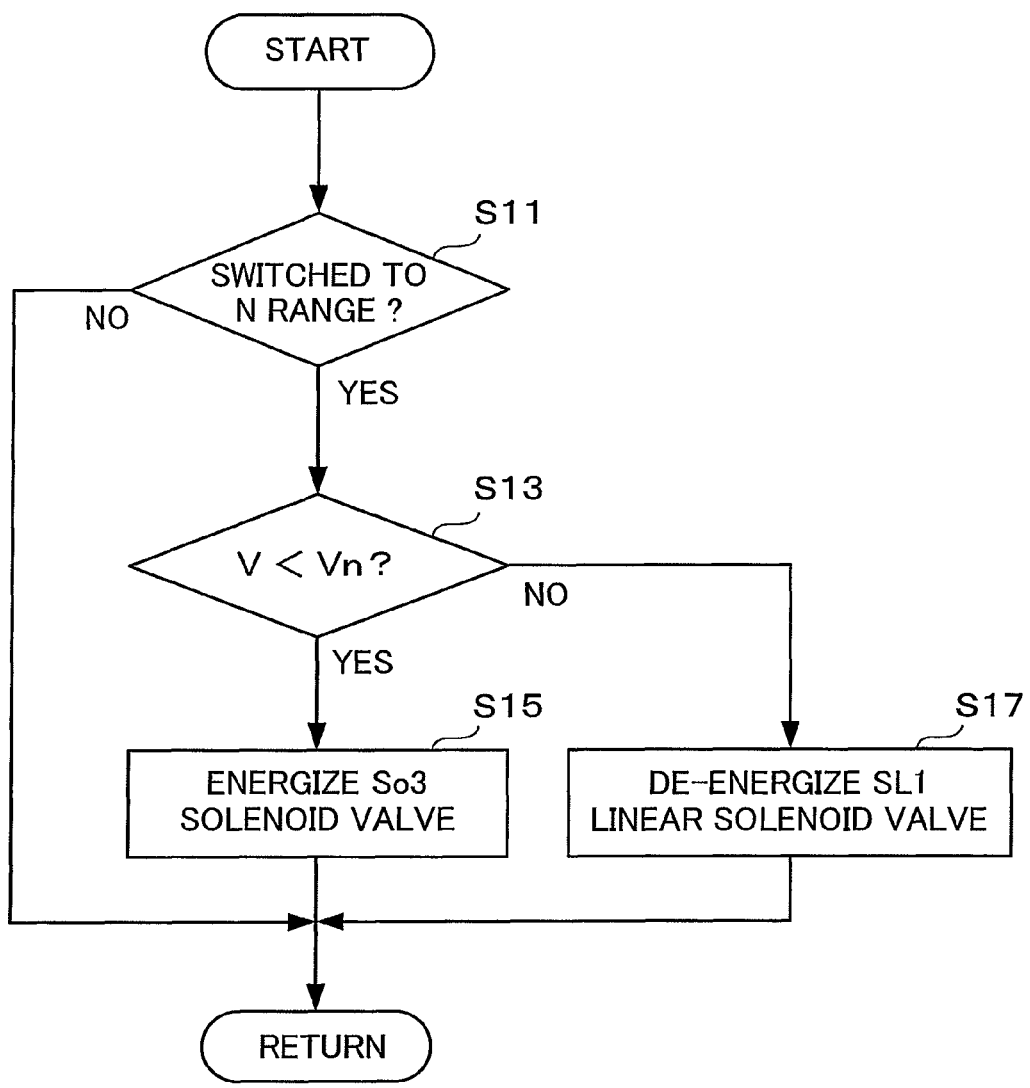
FIG. 8 is a flowchart representing a control process of an automatic transmission in the first embodiment of the present invention.

Referring now to FIG. 8, the operation of the first embodiment of the control apparatus for the automatic transmission will be described.

The process shown in FIG. 8 illustrates the control process of the automatic transmission executed by the CPU 102 with the use of the RAM 103 as a work area. The control process of the automatic transmission is adapted to be executed by the CPU 102 every predetermined time interval.

As shown in FIG. 8, the CPU 102 judges whether the shift range is switched to the N range (step S11). More specifically, the CPU 102 judges whether the shift range is switched to the N range from the D range on the basis of the detected signal of the shift sensor 76.

In the following description on the control process of the automatic transmission in the present embodiment, only the C1 clutch 44 enters the engagement state in the D range, and the vehicle 10 is cruising under the condition where the 1st shift stage is formed.

When the CPU 102 judges that the shift range is not switched to the N range ("NO" in the step S11), the CPU 102 finishes this process. On the other hand, when the CPU 102 judges that the shift range is switched to the N range ("YES" in the step S11), the CPU 102 judges whether the vehicle speed V is smaller than the N range forming method changing threshold Vn stored in the EEPROM 104 on the basis of the detected signal of the vehicle speed sensor 73 (step S13).

When the CPU 102 judges that the vehicle speed V is smaller than the N range forming method changing threshold Vn ("YES" in step S13), the CPU 102 controls the So3 solenoid valve 130 (see FIG. 6) to enter the energized state (step S15).

As described above, the line pressure PL is supplied to the input port 152 of the switching valve 150 from the output port 134 of the So3 solenoid valve 130 when the So3 solenoid valve 130 is set into the energized state, which makes the spool 156 move to the lower end position. Therefore, the switching valve 150 enters the cut-off state. When the switching valve 150 is in the cut-off state, the supply of the line pressure PL to the SL1 linear solenoid valve 161 is cut off, and the oil pressure in the cylinder of the C1 actuator 201 is released through the drain port 145 of the switching valve 150. As a result, the C1 clutch 44 enters the disengagement state, so that the non-transmission state is formed.

When the CPU 102 judges that the vehicle speed V is no less than the N range forming method changing threshold Vn ("NO" in step S13), the CPU 102 controls the SL1 linear solenoid valve 161 to enter the de-energized state (step S17).

As described above, the SL1 linear solenoid valve 161 is in the cut-off state when the SL1 linear solenoid valve 161 is in the de-energized state. When SL1 linear solenoid valve 161 is set into the de-energized state, the communication between the input port 171 and the output port 181 is cut off, and the communication between the output port 181 and the drain port 191 is established. As a result, the oil pressure in the cylinder of the C1 actuator 201 is released from the drain port 145 through the output port 181. Therefore, the C1 clutch 44 enters the disengagement state, so that the non-transmission state is formed.

The scope of the invention is not limited to the above mentioned first embodiment where the shift range is switched to the N range from the D range, in which the 1st shift stage is formed. The effect of the invention is also achieved when the shift range is switched to the N range from the D range (or the sports range), in which one of the ranges other than the 1st shift range is formed. Furthermore, the shift range can be switched to the N range from the reverse range.

In this case, the CPU 102 controls the solenoid valves or the linear solenoid valves being operated to form the shift range and the shift stage from which the N range is formed, to enter the de-energized state in step S17 shown in FIG. 8. For example, when the shift stage was the 6th stage before the N range is formed, the CPU 102 controls the SL2 linear solenoid valve 162 and the SL4 linear solenoid valve 164 to enter the de-energized state in step S17.

As described above, the control apparatus for the automatic transmission according to the present embodiment of this invention can cut off the supply of the line pressure to the linear solenoid valves 161 to 166 by the So3 solenoid valve 130 and the switching valve 150 when, for example, the vehicle 10 stops, even if the operation states of the one or more of the C1 to C4 clutches and the B1 and B2 brakes cannot be switched due to the malfunction of the corresponding linear solenoid valves 161 to 166. This results from the fact that the ECU 100 can form the non-transmission state by controlling each of the linear solenoid valves 161 to 166 or both the So3 solenoid valve 130 and the switching valve 150, selectively, in accordance with the vehicle speed V detected by the vehicle speed sensor 73 when the shift range is set to the N range. As a result, the rotational drive force from the engine 11 is prevented from being transmitted to the output shaft 56 through the input shaft 22 when the shift range is set to N range by the ECU 100. Therefore the control apparatus for the automatic transmission according to the present embodiment of this invention can prevent the behavior of the vehicle 10 being inconsistent with the operation of the shift lever 3 by the driver, and can improve the safety as compared to that of the prior art.

The control apparatus for the automatic transmission according to the present embodiment of this invention can cut off the supply of the hydraulic oil to the linear solenoid valves 161 to 166 by the So3 solenoid valve 130 and the switching valve 150 when, for example, the vehicle 10 stops, even if the operation states of the one or more of the C1 to C4 clutches and the B1 and B2 brakes cannot be switched due to the malfunction of the corresponding linear solenoid valves 161 to 166. This results from the fact that the ECU 100 can form the non-transmission state by controlling each of the linear solenoid valves 161 to 166 or both the So3 solenoid valve 130 and the switching valve 150, selectively, in accordance with the vehicle speed V detected by the vehicle speed sensor 73. As a result, the rotational drive force from the engine 11 is prevented from being transmitted to the output shaft 56 through the input shaft 22 when the shift range is set to N range by the ECU 100. Therefore the control apparatus for the automatic transmission according to the present embodiment of this invention can prevent the behavior of the vehicle 10 being inconsistent with the operation of the shift lever 3 by the driver, thereby improving the safety as compared to that of the prior art.

When the vehicle 10 is cruising, the linear solenoid valves 161 to 166 can cut off the supply of the hydraulic oil to the C1 to C4 clutches and the B1 and B2 brakes. As a result, even if the operation states of the one or more of the C1 to C4 clutches and the B1 and B2 brakes cannot be switched due to the malfunction of the corresponding linear solenoid valves 161 to 166, the behavior of the vehicle 10 is consistent with the operation of the shift lever 3 by the driver when the N range is set by the ECU 100, as long as the vehicle 10 is cruising. Therefore the driver can be prevented from feeling uncomfortable with the behavior of the vehicle 10. While there is no malfunction in any one of the linear solenoid valves 161 to 166, the immediate responsiveness of the C1 to C4 clutches and the B1 and B2 brakes is improved when the shift range is set from the N range to one of the other ranges by the ECU 100, as compared to the case where the supply of the hydraulic oil to the C1 to C4 clutches and the B1 and B2 brakes is cut off by the So3 solenoid valve 130 and the switching valve 150.

The control apparatus for the automatic transmission according to the present embodiment of this invention can switch the operation states of the C1 to C4 clutches and the B1 and B2 brakes from the engagement state to the disengagement state, by means of controlling each of the linear solenoid valves 161 to 166 and/or both the So3 solenoid valve 130 and the switching valve 150 to cut off the supply of the hydraulic oil to the C1 to C4 clutches and the B1 and B2 brakes, so as to form the non-transmission state.

The control apparatus for the automatic transmission according to the present embodiment of this invention can switch the operation states of the C1 to C4 clutches and the B1 and B2 brakes in accordance with the electric signals outputted by the ECU 100. Since the linear solenoid valves 161 to 166 in the de-energized state can cut off the supply of the hydraulic oil to the C1 to C4 clutches and the B1 and B2 brakes, the control apparatus for the automatic transmission according to the present embodiment of this invention can cut off the supply of the hydraulic oil to the C1 to C4 clutches and the B1 and B2 brakes and can form the non-transmission state, even in the case where the ECU 100 cannot properly output the electric signals to the linear solenoid valves 161 to 166.

In the control apparatus for the automatic transmission according to the present embodiment of this invention, since the linear solenoid valves 161 to 166 are provided closer to the C1 to C4 clutches and the B1 and B2 brakes than the So3 solenoid valve 130 and the switching valve 150 on the hydraulic path through which the hydraulic oil is supplied to the C1 to C4 clutches and the B1 and B2 brakes, the operation states of the C1 to C4 clutches and the B1 and B2 brakes can be rapidly set into the disengagement state in the case where each of the linear solenoid valves 161 to 166 is controlled to cut off the supply of the hydraulic oil to the C1 to C4 clutches and the B1 and B2 brakes, as compared to the case where the So3 solenoid valve 130 and the switching valve 150 are controlled to cut off the supply of the hydraulic oil to the C1 to C4 clutches and the B1 and B2 brakes. Therefore, the immediate responsiveness of the C1 to C4 clutches and the B1 and B2 brakes is improved as compared to the case where the So3 solenoid valve 130 and the switching valve 150 are controlled to cut off the supply of the hydraulic oil to the C1 to C4 clutches and the B1 and B2 brakes.

Although the above mentioned control apparatus for the automatic transmission according to the first embodiment of is adapted to form the non-transmission state by controlling selectively the So3 solenoid valve 130 or the SL1 linear solenoid valve 161 in accordance with the vehicle speed V, the control apparatus for the automatic transmission may be adapted to form the non-transmission state by the So3 solenoid valve 130 and the SL1 linear solenoid valve 161 when the vehicle speed V is smaller than the N range forming method changing threshold Vn, which will be described hereinafter as the second embodiment of the present invention.

Second Embodiment

The second embodiment of the present invention will be described hereinafter with reference to the drawings. The constitutional elements which are the same as those of the first embodiment will be omitted, and stating only about the different aspects. Here, a vehicle in the second embodiment is the same as that of the first embodiment except for the function and the process of the ECU. The constitutional elements which are the same as those of the vehicle 10 in the first embodiment shown in FIGS. 1 to 7 will be assigned the same reference numerals and legends as those of the first embodiment.

In the case where the shift lever 3 is operated to the operation position corresponding to the N range set by the ECU 100, the ECU 100 is adapted to control each of the linear solenoid valves 161 to 166 and both the So3 solenoid valve 130 and the switching valve 150 to form the non-transmission state when the vehicle speed V detected by the vehicle speed sensor 73 is smaller than the N range forming method changing threshold Vn, while the ECU 100 is adapted to control each of the linear solenoid valves 161 to 166 to form the non-transmission state when the vehicle speed V detected by the vehicle speed sensor 73 is no less than the N range forming method changing threshold Vn.

The operation of the present embodiment will be described hereinafter.

Figure 9:
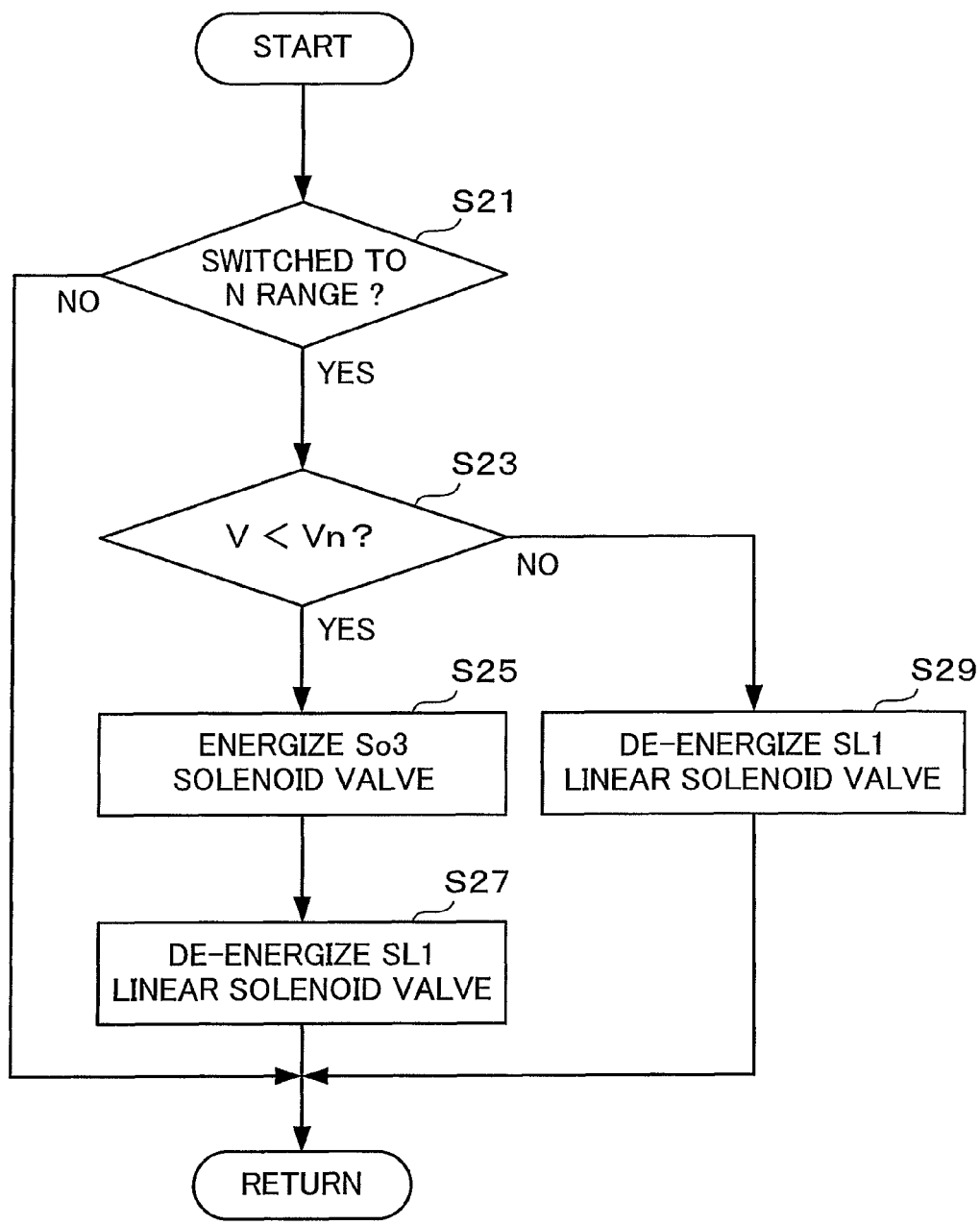
FIG. 9 is a flowchart representing a control process of an automatic transmission in the second embodiment of the present invention.

Referring now to FIG. 9, the control process of the second embodiment of the control apparatus for the automatic transmission will be described.

As shown in FIG. 9, the CPU 102 judges whether the shift range is switched to the N range (step S21).

When the CPU 102 judges that the shift range is not switched to the N range ("NO" in step S21), the CPU 102 finishes this process. On the other hand, when the CPU 102 judges that the shift range is switched to the N range ("YES" in step S21), the CPU 102 judges whether the vehicle speed V is smaller than the N range forming method changing threshold Vn stored in the EEPROM 104 on the basis of the detected signal of the vehicle speed sensor 73 (step S23).

When the CPU 102 judges that the vehicle speed V is smaller than the N range forming method changing threshold Vn ("YES" in step S23), the CPU 102 controls the So3 solenoid valve 130 (see FIG. 6) to enter the energized state (step S25).

The CPU 102 controls the So3 solenoid valve 130 to enter the energized state (step S25) before the CPU 102 controls the SL1 linear solenoid valve 161 to enter the de-energized state (step S27) and finishes this process.

On the other hand, the CPU 102 judges that the vehicle speed V is no less than the N range forming method changing threshold Vn ("NO" in step S23), the CPU 102 controls the SL1 linear solenoid valve 161 to enter the de-energized state (step S29).

As described above, the ECU 100 is adapted to control each of the linear solenoid valves 161 to 166 and both the So3 solenoid valve 130 and the switching valve 150 to form the non-transmission state when the vehicle speed V detected by the vehicle speed sensor 73 is smaller than the N range forming method changing threshold Vn. Therefore, even if the operation states of the one or more of the C1 to C4 clutches and the B1 and B2 brakes cannot be switched due to the malfunction of the corresponding linear solenoid valves 161 to 166, the control apparatus for the automatic transmission according to the present embodiment of this invention can cut off the supply of the hydraulic oil to the linear solenoid valves 161 to 166 by the So3 solenoid valve 130 and the switching valve 150 if, for example, the vehicle 10 stops. As a result, the rotational drive force from the engine 11 is prevented from being transmitted to the output shaft 56 through the input shaft 22 when the shift range is set to N range by the ECU 100. Therefore the control apparatus for the automatic transmission according to the present embodiment of this invention can prevent the behavior of the vehicle 10 being inconsistent with the operation of the shift lever 3 by the driver, thereby improving the safety as compared to that of the prior art. Moreover, even if the hydraulic oil supplied to the plurality of linear solenoid valves 161 to 166 cannot be cut off due to the malfunction of the So3 solenoid valve 130 and the switching valve 150, the control apparatus for the automatic transmission according to the present embodiment of this invention can form the non-transmission state since the control apparatus for the automatic transmission can switch the operation states of the C1 to C4 clutches and the B1 and B2 brakes by the linear solenoid valves 161 to 166.

The supply of the hydraulic oil to the C1 to C4 clutches and the B1 and B2 brakes can be cut off by the linear solenoid valves 161 to 166 when the vehicle speed V detected by the vehicle speed sensor 73 is no less than the N range forming method changing threshold Vn, that is, for example, the vehicle 10 is cruising. As a result, even if the operation states of the one or more of the C1 to C4 clutches and the B1 and B2 brakes cannot be switched due to the malfunction of the corresponding linear solenoid valves 161 to 166, the behavior of the vehicle 10 is consistent with the operation of the shift lever 3 by the driver when the N range is set by the ECU 100, as long as the vehicle 10 is cruising. Therefore the driver can be prevented from feeling uncomfortable with the behavior of the vehicle 10. While there is no malfunction in any one of the linear solenoid valves 161 to 166, the immediate responsiveness of the C1 to C4 clutches and the B1 and B2 brakes is improved, as compared to the case where the supply of the hydraulic oil to the C1 to C4 clutches and the B1 and B2 brakes is cut off by the So3 solenoid valve 130 and the switching valve 150.

The scope of the invention is not limited to the above mentioned embodiments where the control apparatus for the automatic transmission is provided with one supply state switching means constituted by the So3 solenoid valve 130 and the switching valve 150. The effect of the invention is also achieved in the case where the control apparatus for the automatic transmission is provided with more than one supply state switching means. For example, the number of the supply state switching means may be six, corresponding to each of the linear solenoid valves 161 to 166. In this case, the number of the supply state switching means is determined in accordance with the structure of the automatic transmission 12 and the hydraulic control apparatus 60.

The scope of the invention is not limited to the above mentioned embodiments where the So1 to So3 solenoid valves 110 to 130 and the linear solenoid valves 161 to 166 are in the closed state in the de-energized state, that is, N/C (Normally-Closed). The effect of the invention is also achieved in the case where the So1 to So3 solenoid valves 110 to 130 and the linear solenoid valves 161 to 166 are open in the de-energized state, that is, N/O (Normally-Open). Furthermore, one or more of the So1 to So3 solenoid valves 110 to 130 and the linear solenoid valves 161 to 166 may be N/C, and the others may be N/O.

The scope of the invention is not limited to the above mentioned embodiments where the control apparatus for the automatic transmission is provided with one ECU. The effect of the invention is also achieved in the case where the control apparatus for the automatic transmission is provided with more than one ECU. For example, the ECU 100 in the present embodiment may be constituted by a plurality of ECUs such as E-ECUs adapted to control the output of the engine 11, and T-ECUs adapted to control the speed change of the automatic transmission 12. In this case, each of the ECUs is adapted to provide electric signals to other ECUs, and to receive electric signals from other ECUs.

The scope of the invention is not limited to the above mentioned embodiments where the control apparatus for the automatic transmission according to the present invention is applied to the speed change mechanism adapted to realize the speed change of the automatic transmission by switching the operation states of the plurality of friction engagement elements. The control apparatus for the automatic transmission according to the present invention may be applied to, for example, a belt type stepless speed variator, that is, continuously variable transmission, comprising a first axis and a second axis which are held rotatable in a case, a primary pulley provided at the first axis, a secondary pulley provided at the second axis, a belt for coupling the primary pulley with the secondary pulley, a forward-reverse switching mechanism for changing the direction of rotation of the first axis and the second axis. In this case, the electronic control unit is adapted to control the plurality of the solenoid valves and the linear solenoid valves, so that the operation states of the clutches and the brakes serving as the friction engagement elements partly constituting the forward-reverse switching mechanism.

As described above, the control apparatus for the automatic transmission according to the present invention is capable of preventing the friction engagement elements from being kept in accordance with the traveling state of the vehicle when the shift lever is operated to the position where the neutral range is formed, even if the malfunction of the one or more solenoid valves occurs.

The invention claimed is:

1. A control apparatus for an automatic transmission, comprising:
    a speed change mechanism including an input shaft for inputting a rotational drive force from a driving source, an output shaft for transmitting the rotational drive force to a plurality of wheels, and a plurality of friction engagement elements, operation states of which being switched between an engagement state and a disengagement state, so as to change a speed of a rotation inputted from the input shaft and to output the rotation with the changed speed;
    an operating member for selecting one of a plurality of shift ranges including a neutral range by being operated to one of a plurality of operation positions;
    operation position detecting means for detecting one of the operation positions to where the operating member is operated;
    a plurality of operation state switching means for switching the operation states of the plurality of friction engagement elements by regulating oil pressure of hydraulic oil which is supplied to the plurality of friction engagement elements;
    vehicle speed detecting means for detecting a vehicle speed of a vehicle;
    supply state switching means for switching operation states between a supply state in which the hydraulic oil is supplied to the plurality of operation state switching means and a cut-off state in which supply of hydraulic oil to the plurality of operation state switching means is cut off; and
    control means for setting one selected from among the plurality of shift ranges on the basis of the operation position detected by the operation position detecting means, the control means being adapted to form, in the case where the operating member is operated to one of the plurality of operation positions corresponding to the neutral range, a non-transmission state where the rotational drive force is prevented from being transmitted to the output shaft from the input shaft, by controlling the supply state switching means when the vehicle speed detected by the vehicle speed detecting means is smaller than a predetermined vehicle speed, whereas the control means being adapted to form the non-transmission state by controlling the plurality of operation state switching means when the vehicle speed detected by the vehicle speed detecting means is no less than the predetermined vehicle speed.

2. A control apparatus for an automatic transmission as set forth in claim 1, in which,
in the case where the control means sets the neutral range, the control means is adapted to form the non-transmission state by controlling the plurality of operation state switching means and the supply state switching means when the vehicle speed detected by the vehicle speed detecting means is smaller than a predetermined vehicle speed, whereas the control means is adapted to form the non-transmission state by controlling the plurality of operation state switching means when the vehicle speed detected by the vehicle speed detecting means is no less than a predetermined vehicle speed.

3. A control apparatus for an automatic transmission as set forth in claim 1, in which
the control means is adapted to control the plurality of operation state switching means and/or the supply state switching means to cut off supply of the hydraulic oil to the plurality of friction engagement elements, so as to form the non-transmission state.

4. A control apparatus for an automatic transmission as set forth in claim 1, in which
each of the plurality of operation state switching means is constituted by a linear solenoid valve, the linear solenoid valve enters the cut-off state in which supply of the hydraulic oil to corresponding the friction engagement element is cut off in a de-energized state, whereas the linear solenoid valve enters the supply state in which the hydraulic oil is supplied to corresponding the friction engagement element in an energized state.

5. A control apparatus for an automatic transmission as set forth in claim 1, in which
the plurality of operation state switching means are provided closer to the plurality of friction engagement elements than the supply state switching means on hydraulic paths through which the hydraulic oil is supplied to the plurality of friction engagement elements.

6. A control apparatus for an automatic transmission, comprising:
a speed change mechanism including an input shaft for inputting a rotational drive force from a driving source, an output shaft for transmitting the rotational drive force to a plurality of wheels, and a plurality of friction engagement elements, operation states of which being switched between an engagement state and a disengagement state, so as to change a speed of a rotation inputted from the input shaft and to output the rotation with the changed speed;
a shift lever for selecting one of a plurality of shift ranges including a neutral range by being operated to one of a plurality of operation positions;
a shift sensor for detecting one of the operation positions to where the shift lever is operated;
a plurality of linear solenoid valves for switching the operation states of the plurality of friction engagement elements by regulating oil pressure of hydraulic oil which is supplied to the plurality of friction engagement elements;
a vehicle speed sensor for detecting a vehicle speed of a vehicle;
a switching valve for switching operation states between a supply state in which the hydraulic oil is supplied to the plurality of linear solenoid valves and a cut-off state in which supply of hydraulic oil to the plurality of linear solenoid valves is cut off;
a solenoid valve for switching the operation states of the switching valve; and
an electronic control unit for setting one selected from among the plurality of shift ranges on the basis of the operation position detected by the shift sensor, the electronic control unit being adapted to form, in the case where the shift lever is operated to one of the plurality of operation positions corresponding to the neutral range, a non-transmission state where the rotational drive force is prevented from being transmitted to the output shaft from the input shaft, by controlling the solenoid valve when the vehicle speed detected by the vehicle speed sensor is smaller than a predetermined vehicle speed, whereas the electronic control unit being adapted to form the non-transmission state by controlling the plurality of linear solenoid valves when the vehicle speed detected by the vehicle speed sensor is no less than the predetermined vehicle speed.

7. The control apparatus for an automatic transmission as set forth in claim 6, in which
in the case where the electronic control unit sets the neutral range, the electronic control unit is adapted to form the non-transmission state by controlling the plurality of linear solenoid valves and the solenoid valve when the vehicle speed detected by the vehicle speed sensor is smaller than the predetermined vehicle speed, whereas the electronic control unit is adapted to form the non-transmission state by controlling the plurality of linear solenoid valves when the vehicle speed detected by the vehicle speed sensor is no less than a predetermined vehicle speed.

8. A control apparatus for an automatic transmission as set forth in claim 6, in which
the electronic control unit is adapted to control the plurality of linear solenoid valves and/or the solenoid valve to cut off supply of the hydraulic oil to the plurality of friction engagement elements, so as to form the non-transmission state.

9. A control apparatus for an automatic transmission as set forth in claim 6, in which
each of the plurality of linear solenoid valves enters the cut-off state in which supply of the hydraulic oil to corresponding the friction engagement element is cut off in a de-energized state, whereas each of the plurality of linear solenoid valves enters the supply state in which the hydraulic oil is supplied to corresponding the friction engagement element in an energized state.

10. A control apparatus for an automatic transmission as set forth in claim 6 in which
the plurality of the linear solenoid valves are provided closer to the plurality of friction engagement elements than the solenoid valve on hydraulic paths through which the hydraulic oil is supplied to the plurality of friction engagement elements.

* * * * *